Figure 1:
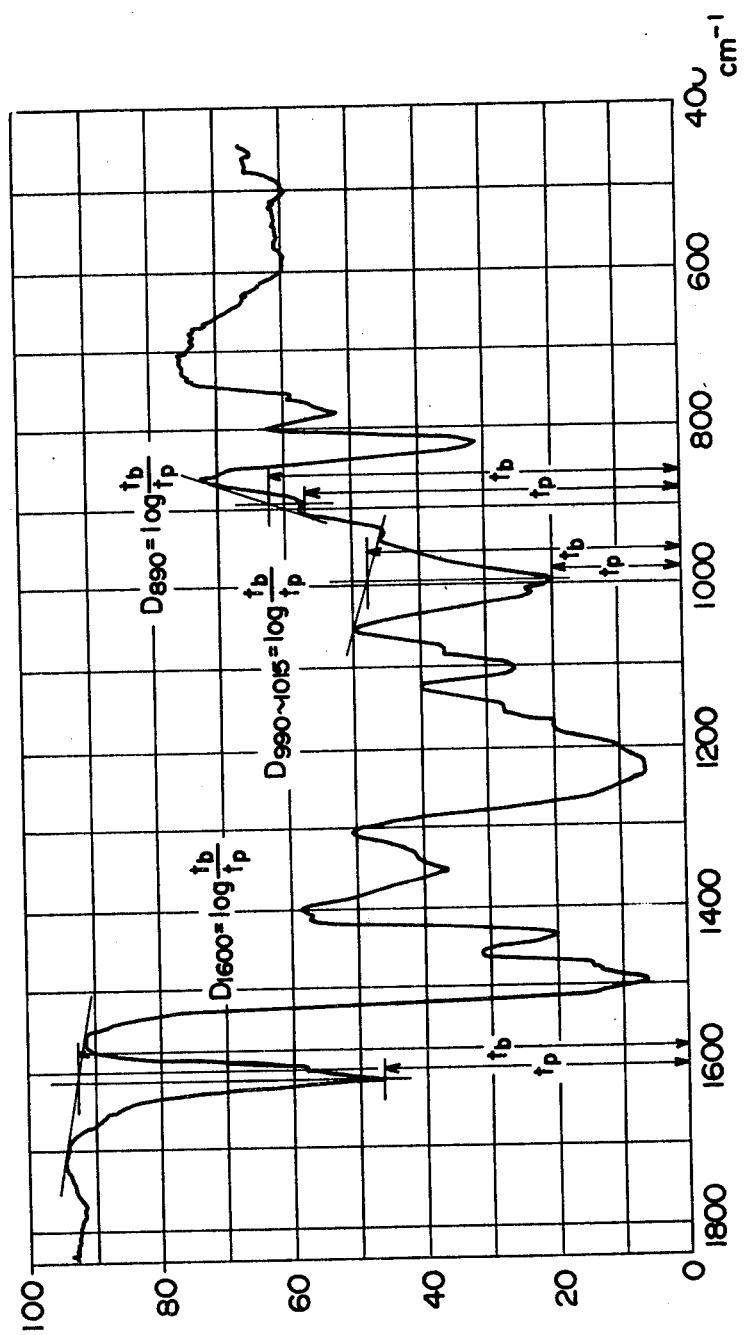

United States Patent [19]
Koyama et al.

[11] Patent Number: 4,460,730
[45] Date of Patent: Jul. 17, 1984

[54] COMPOSITION CONTAINING A POWDER OF AN INORGANIC MATERIAL

[75] Inventors: Hiroaki Koyama; Shigeo Shimizu, both of Kobe, Japan

[73] Assignee: Kanebo, Ltd., Tokyo, Japan

[21] Appl. No.: 494,437

[22] Filed: May 13, 1983

[30] Foreign Application Priority Data

May 14, 1982 [JP] Japan ................................. 57-80078
May 14, 1982 [JP] Japan ................................. 57-80079

[51] Int. Cl.$^3$ ........................ C08L 61/10; C08L 61/34
[52] U.S. Cl. .................................... 524/403; 524/404; 524/405; 524/406; 524/408; 524/413; 524/414; 524/417; 524/420; 524/423; 524/424; 524/425; 524/428; 524/430; 524/432; 524/433; 524/437; 524/442; 524/445; 524/447; 524/448; 524/449; 524/450; 524/453; 524/454; 524/456
[58] Field of Search ............... 524/439, 440, 594, 595, 524/430, 431, 432, 433, 403, 406, 408, 424, 434, 436; 528/137, 162

[56] References Cited

U.S. PATENT DOCUMENTS 2,970,121  1/1961  Schmittberger ...................... 524/13
3,932,344  1/1976  O'Day et al. ......................... 524/406
4,414,378  11/1983  Koyama et al. ..................... 528/137
4,414,379  11/1983  Koyama et al. ..................... 528/137

FOREIGN PATENT DOCUMENTS 48-11284  4/1973  Japan .
51-13491  4/1976  Japan .
53-42077  11/1978  Japan .

Primary Examiner—Lewis T. Jacobs
Attorney, Agent, or Firm—Sherman & Shalloway

[57] ABSTRACT

A composition having a high content of an inorganic material comprising (1) a granular or powdery phenol-aldehyde resin which is a condensation product of a phenol, an aldehyde and optionally a nitrogen-containing compound having at least two active hydrogens and is characterized by (A) containing spherical primary particles and their secondary agglomerated particles each having a particle diameter of 0.1 to 150 microns, (B) having such a size that at least 50% by weight thereof can pass through a 100 Tyler mesh sieve, and (C) having a free phenol content, determined by liquid chromatography, of not more than 500 ppm, and (2) a powder of an inorganic material, the amount of the phenol-aldehyde resin being less than 11% by weight based on the total weight of the phenol-aldehyde resin (1) and the powdery inorganic material (2).

16 Claims, 2 Drawing Figures

COMPOSITION CONTAINING A POWDER OF AN INORGANIC MATERIAL

This invention relates to a composition containing a powder of an inorganic material. More specifically, this invention relates to a composition comprising a powdery inorganic material and a novel granular or powdery phenol-aldehyde resin having good flow characteristics and reactivity and showing excellent moldability and an excellent carbonization yield either alone or in combination with various powdery inorganic materials. This composition is suitable for the production of inorganic molded articles such as ceramics having various excellent mechanical and other properties.

The novolak resins are usually produced by reacting an excess of phenol with formaldehyde in the presence of an acid catalyst such as oxalic acid (usually in an amount of 0.2 to 2%) while maintaining the mole ratio of phenol to formaldehyde at, for example, 1:0.7–0.9. The novolak resins so produced have no self-crosslinkability and are thermoplastic because they are composed of, as main components, tri-, tetra- and pentamers resulting from the bonding of phenol moieties mainly by methylene groups and contain almost no methylol groups. The novolak resins can be converted to cured resins by, for example, reacting them under heat with a crosslinking agent, such as hexamine (hexamethylenetetramine), which is at once a formaldehyde generator and an organic base (catalyst) generator, or by mixing them with a solid acid catalyst and paraformaldehyde and reacting them under heat.

The novolak resin is powdery and easy to handle. But when a molded article of the novolak resin containing a large amount of a powdery inorganic material is heat-cured, curing reaction proceeds from the surface of the article toward its inside, and frequently a cured article having an insufficiently cured interior is obtained. If such a cured article is calcined at a very high temperature, gases are generated in the interior of the article to cause cracks or blisters. As the calcination proceeds, the cracks or blisters become remarkable, and it is extremely difficult to produce an inorganic molded article having a satisfactory quality.

The resol resins are usually supplied as a solution. It is extremely difficult therefore to mold the resol resin itself after removing the solvent from it because at the time of removing the solvent, gellation proceeds abruptly to produce foams. It is thus the usual practice to mold it after removing the solvent by using a filler substance. When a powdery inorganic material is used, this removal of the solvent can be effected relatively easily. However, when such a molded article is heated to cure or calcine it, gellation reaction still proceeds abruptly. Consequently, as in the case of the novolak resins, blisters or cracks occur, and it is extremely difficult to produce inorganic molded articles having satisfactory quality in regard to strength or hardness.

Comparatively recently, a process for producing cured novolak resin fibers was suggested which comprises heating a novolak resin at a high temperature to form a product having a considerably high degree of condensation, purifying the product by removing components having a low degree of condensation thereby to obtain a product having a relatively high degree of condensation and comprising phenol moieties linked to each other by 7 to 10 methylene groups, melt-spinning the product to form novolak fibers, dipping the fibers in an aqueous solution of hydrochloric acid and formaldehyde and gradually heating the solution from room temperature to allow curing reaction to proceed from the surface of the fibers (Japanese Patent Publication No. 11284/1973). Granules or powders obtained by cutting or pulverizing the cured fibers are expensive, and do not possess good flow characteristics. Accordingly, a molded article having these fibers uniformly dispersed therein is difficult to produce.

Several years ago, a process was disclosed which comprises reacting a phenol and formaldehyde in the presence of at least a nitrogen-containing compound as a catalyst, and reacting the resulting condensate with a hydrophilic polymeric compound to form a granular or powdery resin (Japanese Patent Publication No. 42077/1978). The resulting resin in the non-gelled state contains as much as about 5 to 6% of free phenol (Examples 1 to 4 of the Japanese patent document), and a gelled product of the resin (Example 5 of the Japanese patent document) is a very hard non-reactive resin and contains a hydrophilic polymeric compound. Hence, this causes the defect that cracks or gas blisters occur in an inorganic molded article produced by curing or calcining a molded article obtained by using it as a filler.

A process is also known which comprises reacting a phenol and formaldehyde in a basic aqueous solution, mixing the resulting prepolymer with a protective colloid, and coagulating the prepolymer under acidity to form inert solid beads (Japanese Patent Publication No. 13491/1976). The coagulated product corresponds to a cured product of a resol resin, and has no reactivity. Furthermore, since it contains a salt or acid and the protective colloid, an inorganic molded article produced by curing or calcining a molded article obtained by using it as a filler has the defect that cracks or gas blisters form.

As stated above, attempts have previously been made to use the phenol-aldehyde resin as a filler for molded articles. However, it is difficult to obtain the phenol-aldehyde resin in a form or shape suitable for fillers. Furthermore, the phenol-aldehyde resin has the disadvantage of containing substances which will undesirably affect molded articles during curing or calcination.

The present inventors previously provided a novel, granular or powdery phenol-aldehyde resin free from the aforesaid disadvantages and defects, and a process for its production.

It is an object of this invention therefore to provide a composition comprising this novel granular powdery resin and a powder of an inorganic material.

Another object of this invention is to provide a granular or powdery composition having good moldability comprising a minor proportion of a granular or powdery resin having good flow characteristics and a larger proportion of a powder of a inorganic material.

Still another object of this invention is to provide a composition which can give an inorganic molded article having uniform quality in its entirety and being substantially free from cracks or gas blisters attributed to curing or calcination, by using a granular or powdery resin having reactivity with itself or with another resin.

Yet another object of this invention is to provide a composition which gives an inorganic molded article having excellent mechanical properties such as high impact strength or excellent electrical properties.

A further object of this invention is to provide a composition which gives an inorganic molded article having excellent mechanical properties or excellent heat resistance, sliding characteristics or chemical resistance.

Other objects and advantages of this invention will become apparent from the following description.

In accordance with this invention, these objects and advantage of the invention are achieved by a composition comprising (1) a granular or powdery phenol-aldehyde resin which is a condensation product of a phenol, an aldehyde and optionally a nitrogen-containing compound having at least two active hydrogens and is characterized by (A) containing spherical primary particles and their secondary agglomerated particles each having a particle diameter of 0.1 to 150 microns, (B) having such a size that at least 50% by weight thereof can pass through a 100 Tyler mesh sieve, and (C) having a free phenol content, determined by liquid chromatography, of not more than 500 ppm, and (2) a powder of an inorganic material, the amount of the phenol-aldehyde resin being less than 11% based on the total weight of the phenol/aldehyde resin (1) and the powdery inorganic material (2).

The granular or powdery phenol-aldehyde resin used in this invention is produced from a phenol, an aldehyde and optionally a nitrogen-containing compound having at least two hydrogens by a method to be described hereinbelow.

The granular or powdery phenol-aldehyde resin (to be referred to as the granular or powdery resin) is characterized by (A), (B) and (C) stated above. The limitation that the spherical primary particles and their secondary agglomerated particles have a particle diameter of 0.1 to 150 microns (A), the limitation that at least 50% by weight of the entire resin can pass through a 100 Tyler mesh sieve (B), and the limitation that the resin has a free phenol content, determined by liquid chromatography, of not more than 500 ppm (C) are based on the measuring methods to be described hereinbelow.

A first feature of the resin used in the invention is that it consists mostly of spherical primary particles and second particles resulting from the agglomeration of the primary particles, each having a particle diameter of 0.1 to 150 microns, preferably 0.1 to 100 microns as specified in (A) above and is quite different from a forcibly pulverized product of a cured product of a known novolak or resol resin or a pulverization product of known cured novolak fibers.

Usually at least 30%, preferably at least 50%, of the granular or powdery resin consists of spherical primary particles and their agglomerated secondary particles each of which has a particle diameter of 0.1 to 150 microns, preferably 0.1 to 100 microns.

In the case of the granular or powdery resin containing the nitrogen-containing compound, usually at least 30%, preferably at least 50%, thereof consists of spherical primary particles and secondary particles resulting from the agglomeration of the primary particles, each of which has a particle diameter of 0.1 to 100 microns, preferably 0.1 to 50 microns. The expression 30% or 50% means that as defined in the description of the method for measuring the particle diameter given hereinbelow, it is 30% or 50% based on the number of entire particles (including the secondary agglomerated particles) of the resin in one visual field of an optical microscope having a magnification of 100 to 1,000. It is preferred that 70% to substantially 100% of the granular or powdery product consists of spherical primary particles and secondary agglomerated particles each having a particle diameter of 0.1 to 150 microns (0.1 to 100 microns in the case of the resin containing the nitrogen-containing compound). Especially preferably, at least 30%, especially at least 50%, of the number (as an average of those in five visual fields) of particles in the visual field of a microphotograph in accordance with the above definition consists of spherical primary particles and secondary agglomerated particles having a particle diameter in the range of 0.1 to 100 microns, preferably 0.1 to 50 microns (in the case of the resin containing the nitrogen-containing compound, 0.1 to 50 microns, preferably 0.1 to 20 microns).

Since the granular or powdery resin product use in this invention is formed mainly of the minute spherical primary particles and the secondary agglomerated particles thereof, it is very small in size as specified in (B) above. Thus, at least 50% by weight, preferably at least 70% by weight, especially preferably at least 80% by weight, of the entire resin passes through a 100 Tyler mesh sieve (a 150 Tyler mesh sieve in the case of the resin containing the nitrogen-containing compound). The expression "passing through the sieve" does not exclude the exertion of a force which does not cause forcible destruction of the particles (including the secondary agglomerated particles) in the procedure of screening the granular or powdery product through the sieve, for example light crumpling of the granular or powdery product by hand, light pushing or levelling of the particles on the mesh by means of a brush, or light tapping of the particles by hand because the particles of the granular or powdery resin of this invention becomes agglomerated as their average particle size becomes smaller.

As specified in (C) above, the granular or powdery resin used in the invention has a free phenol content, determined by liquid chromatography, of not more than 500 ppm. The preferred free phenol content is not more than 250 ppm, above all not more than 100 ppm, for the resin containing the nitrogen-containing compound, and not more than 400 ppm, especially not more than 300 ppm, for the resin not containing the nitrogen-containing compound. That the powdery or granular resin used in the invention has a very low free phenol content is presumably because the process for its production described hereinbelow comprises adding the phenol or the phenol and the nitrogen-containing compound or the diluted solution thereof to the HCl-aldehyde bath to form a uniform solution at least partly, then forming very fine white suspended particles and developing them into stable fine particles, and therefore, substantially all of the phenol added, especially the phenol which participates in the formation of the product of the invention, reacts with the aldehyde present in large excess. The granular or powdery products obtained by the methods disclosed in Japanese Patent Publication No. 42077/1978 cited above has a free phenol content of as high as 0.3 to about 6% by weight. In contrast, the free phenol content of the granular or powdery resin used in the invention is quite small, and this fact is an important advantage of the process of the invention using granular or powdery resins of this kind and is very surprising.

The granular or powdery resin used in this invention may also be defined by the ratio of the absorption intensity of an absorption peak assigned to the aromatic double bond to that of an absorption peak assigned to the methylol group in its infrared absorption spectrum. The positions of the two peaks and their absorption intensities differ somewhat depending upon the presence or absence of the nitrogen-containing compound.

The granular or powdery resin substantially free from the nitrogen-containing compound has a $D_{990\text{-}1015}/D_{1600}$ ratio of from 0.2 to 9.0 in its infrared absorption spectrum determined by a KBr tablet method, wherein $D_{1600}$ represents the absorption intensity of an absorption peak at 1600 cm$^{-1}$ (the peak assigned to benzene) and $D_{990\text{-}1015}$ represents the highest absorption intensity of absorption peaks in the range of 990 to 1015 cm$^{-1}$ (the peaks assigned to the methylol groups). This resin further has a $D_{890}/D_{1600}$ ratio, wherein $D_{890}$ represents the absorption intensity of a peak at 890 cm$^{-1}$ (the peak assigned to a lone hydrogen atom on the benzene ring), of from 0.09 to 1.0. Preferably, it has a $D_{990\text{-}1015}/D_{1600}$ ratio of from 0.2 to 7.0, especially from 0.4 to 5.0, and a $D_{890}/D_{1600}$ ratio of from 0.1 to 0.9, especially from 0.12 to 0.8.

It is widely known with regard to phenolformaldehyde resins that in their infrared absorption spectra, the peak at 1600 cm$^{-1}$ shows an absorption assigned to the benzene ring, the peaks at 990 to 1015 cm$^{-1}$ show absorptions assigned to the methylol groups, and the peak at 890 cm$^{-1}$ shows an absorption assigned to a lone hydrogen atom on the benzene ring.

The granular or powdery resin containing the nitrogen-containing compound has a $D_{960\text{-}1020}/D_{1400\text{-}1500}$ ratio of from 0.1 to 2.0 in its infrared absorption spectrum measured by a KBr tablet method, wherein $D_{1450\text{-}1500}$ represents the highest absorption intensity of absorption peaks in the range of 1450 to 1500 cm$^{-1}$ (the peaks assigned to the aromatic double bond) and $D_{960\text{-}1020}$ represents the highest absorption intensity of absorption peaks in the range of 960 to 1020 cm$^{-1}$ (the peaks assigned to the methylol groups), and preferably further has a $D_{1280\text{-}1360}/D_{1450\text{-}1500}$ ratio of 0.15 to 3.0 in the infrared absorption spectrum, wherein $D_{1280\text{-}1360}$ represents the highest absorption intensity of absorption peaks in the range of 1280 to 1360 cm$^{-1}$ (the peaks assigned to the carbon-nitrogen bond).

Preferably, this resin has a $D_{960\text{-}1020}/D_{1450\text{-}1500}$ ratio of from 0.15 to 0.6 and further a $D_{1280\text{-}1360}/D_{1450\text{-}1500}$ ratio of from 0.2 to 2.0. Especially preferably it has a $D_{960\text{-}1020}/D_{1450\text{-}1500}$ ratio of from 0.2 to 0.4, and further a $D_{1280\text{-}1360}/D_{1450\text{-}1500}$ ratio of from 0.3 to 1.5.

The resin used in this invention further has such a characteristic in its infrared absorption spectrum determined by a KBr tablet method that it has a $D_{1580\text{-}1650}/D_{1450\text{-}1500}$ ratio of from 0.3 to 4.5, preferably from 0.75 to 2.0, especially preferably from 1.0 to 1.5, wherein $D_{1580\text{-}1650}$ represents the highest absorption intensity of absorption peaks in the range of 1580 to 1650 cm$^{-1}$.

Generally, it is difficult to determine the assignment of various functional groups of a substance having a three-dimensional crosslinked structure by an infrared absorption spectroscopic method because peaks in its infrared absorption spectral chart frequently shift greatly. But from the infrared absorption spectra of the phenol-aldehyde resin and various nitrogen-containing compounds, it has been determined that in the infrared absorption spectrum of the resin of this invention, the absorption peaks at 960 to 1020 cm$^{-1}$ are assigned to the methylol groups, the absorption peaks at 1280 to 1360 cm$^{-1}$ are assigned to the carbon-nitrogen bond, and the absorption peaks at 1450 to 1500 cm$^{-1}$ are assigned to the aromatic double bond.

The definite assignment of the absorptions at 1580 to 1650 cm$^{-1}$ is difficult. But since the $D_{1580\text{-}1650}/D_{1450\text{-}1500}$ using the highest absorption intensity of the peaks at 1580 to 1650 cm$^{-1}$ can clearly distinguish from the same ratio in a nitrogen-free phenol-formaldehyde resin, these absorptions can be recognized as characteristic absorptions for identifying the granular or powdery resin containing the nitrogen-containing compound.

It is understood that the ratio of absorption intensities in the infrared absorption spectrum of the product of this invention, for example, $D_{990\text{-}1015}/D_{1600}=0.2\text{-}9.0$ or $D_{980\text{-}1020}/D_{1450\text{-}1500}=0.1\text{-}2.0$ which is one parameter for specifying the granular or powdery resin use in the invention, is a value associated with its structure and shows that this resin contains a considerable amount of the methylol groups and the methylol group content can be adjusted within a certain range.

The preferred product of this invention having a $D_{990\text{-}1050}/D_{1600}$ ratio of from 0.2 to 7.0, or a $D_{960\text{-}1020}/D_{1450\text{-}1500}$ ratio of from 0.15 to 0.6, and above all a $D_{990\text{-}1015}/D_{1600}$ ratio of from 0.4 to 5.0 or a $D_{960\text{-}1020}/D_{1450\text{-}1500}$ ratio of from 0.2 to 0.4 contain methylol groups in a moderate degree of concentration and is stabler.

The fact that in its infrared absorption spectrum the granular or powdery resin used in this invention has a $D_{890}/D_{1600}$ ratio of from 0.09 to 1.0, preferably from 0.1 to 0.9, above all from 0.12 to 0.8, shows that in this resin, the reaction sites (the ortho- and para-positions) of phenol molecules which participated in the reaction are moderately blocked by methylol groups.

Generally, one or both of the $D_{990\text{-}1015}/D_{1600}$ ratio and the $D_{890}/D_{1600}$ ratio of a cured product of a known resol resin are lower than those of the granular or powdery resin used in this invention. A cured product of a known novolak resin cured with hexamine has a $D_{890}/D_{1500}$ ratio which is generally lower than the lower limit of this ratio of the product of this invention.

It has been found by elemental analysis that the granular or powdery resin used in this invention which is substantially free from the nitrogen-containing compound is composed of carbon, hydrogen and oxygen and has the following composition.

C: 70 to 80% by weight
H: 5 to 7% by weight
O: 17 to 21% by weight
(Total 100% by weight)

It has also been found that many of the granular or powdery resins used in this invention which contain the nitrogen-containing compound contain at least 1% by weight, preferably 2 to 30% by weight of nitrogen.

The granular or powdery resin used in this invention can be obtained either as a resin whose curing reaction has not proceeded to a great extent or as a resin whose curing reaction has proceeded to some extent, by the manufacturing process to be described hereinbelow. Accordingly, when the granular or powdery resin used in this invention is pressed at 100° C. for 5 minutes in accordance with the heat fusibility test to be described hereinbelow, at least a part of the resin fuses to form a lumpy or plate-like mass (i), or the resin assumes the form of a granules or powder without substantial melting or melt-adhesion (ii).

Those granular or powdery resins used in this invention which have relatively high heat fusibility as mentioned above shows a methanol solubility, measured by the testing method to be given hereinbelow, of at least 20% by weight, especially at least 30% by weight, and in some cases, at least 40% by weight.

Since the granular or powdery resin contains spherical primary particles and their secondary agglomerated particles each having a particle diameter of 0.1 to 150 microns [the characteristic (A) described hereinabove] in an amount of preferably at least 30%, and usually at least 50% by weight, preferably at least 70% by weight, of the resin particles can pass through a 100 Tyler mesh sieve, the resin has very good flowability and miscibility, and can be mixed with another material easily and intimately. Furthermore, since many of the granular or powdery resins used in this invention contain very minute spherical primary particles as a basic constituent, an inorganic molded article prepared from a resin composition containing this resin has excellent mechanical properties. The granular or powdery resins are very stable at ordinary temperatures and contain considerable amounts of methylol groups. Hence, they show reactivity when heated, and give inorganic molded articles having not only excellent physical and mechanical properties but also excellent sliding characteristics, heat resistance and electrical properties such as electrical insulation, and chemical resistance.

Furthermore, the granular or powdery resin has a free phenol content of usually not more than 500 ppm, and therefore, its handling is very easy, and safe. Furthermore, because of its very low free phenol content, a side-reaction attributed to the phenol is reduced.

The granular or powdery resin does not substantially contain a hydrophilic polymeric compound because it is produced by a process in which the reaction system does not substantially contain a hydrophilic polymeric compound.

The granular or powdery resin used in this invention can be produced by contacting a phenol, or both a phenol and a nitrogen-containing compound containing at least two active hydrogens with a hydrochloric acid-aldehyde bath containing (a) hydrochloric acid (HCl) in a concentration of 3 to 28% by weight, preferably 8 to 25% by weight, above all 12 to 22% by weight and (b) formaldehyde (HCHO) in a concentration of 3 to 25% by weight, preferably 5 to 20% by weight, above all 7 to 15% by weight, and other aldehydes in a concentration of 0 to 10% by weight with (c) the total concentration of hydrochloric acid and formaldehyde being 10 to 40% by weight, preferably 15 to 35% by weight, above all 20 to 32% by weight, while maintaining a bath ratio, defined by the quotient of the weight of the hydrochloric acid-aldehyde bath divided by the total weight of the phenol and the nitrogen-containing compound, of at least 8.

Preferably, in addition to the three requirements (a), (b) and (c), the composition of the HCl-aldehyde bath is such that the mole ratio of the aldehyde in the bath to the phenol to be contacted with the bath or the phenol and the nitrogen-containing compounds combined is at least 2, especially at least 2.5, above all at least 3 [requirement (d)]. There is no particular upper limit to the above mole ratio (d). Preferably, the upper limit is 20, especially 15. The especially preferred mole ratio (d) is from 4 to 15, above all from 8 to 10. The characteristic feature of the aforesaid process is that a bath of an aqueous solution of hydrochloric acid and formaldehyde having a considerably high HCl concentration and containing formaldehyde in molar excess to the phenol or both the phenol and the nitrogen-containing compound is contacted with the phenol or both the phenol and the nitrogen-containing compound at a bath ratio of at least 8, preferably at least 10.

Since the aforesaid process is carried out while the concentration of each of hydrochloric acid and aldehyde is kept at at least 3% by weight, and the bath ratio, at not less than 8, the weight percentage of hydrochloric acid or aldehyde based on the weight of the phenol or the total weight of the phenol and the nitrogen-containing compound is at least 24% by weight. Furthermore, since in this process, the total concentration of hydrochloric acid and formaldehyde is at least 10% by weight, the total weight of hydrochloric acid and aldehyde based on the weight of the phenol or the total weight of the phenol and the nitrogen-containing compound is at least 80% by weight. These reaction conditions are fundamentally different from the reaction conditions for the production of known novolak and resol resins described hereinabove.

When the phenol or the phenol and the nitrogen-containing compound are to be contacted with the HCl aldehyde bath, the bath ratio (as defined hereinabove) is preferably at least 10, especially preferably 15 to 40.

In the aforesaid process, the phenol or the phenol and the nitrogen-containing compound are contacted with the HCl-formaldehyde bath such that after contacting of the phenol with the bath, white suspended particles are formed and thereafter developed into a granular or powdery solid (preferably into a pink-colored granular or powdery solid when the nitrogen-containing compound is not used). The contacting of the phenol and the nitrogen-containing compound with the HCl-aldehyde bath is conveniently carried out such that by adding the phenol and the nitrogen-containing compound together to the HCl-aldehyde bath or first adding the nitrogen-containing compound and then the phenol to the bath, a clear solution is first formed and then white suspended particles are formed and thereafter developed into a granular or powdery solid. In contacting the bath with the phenol or the phenol and the nitrogen-containing compound, it is preferred that before the white suspended particles are formed by the addition of the phenol, the bath be stirred to form a clear, preferably uniform, solution of the phenol or the phenol and the nitrogen-containing compound, and that after the formation of the white suspended particles until the suspended particles change to a solid, the bath (reaction mixture) be not subjected to a mechanical shearing force such as stirring depending upon the ratio of the phenol to the nitrogen-containing compound or the reaction conditions.

The phenol may be added as such, but if desired, it may be diluted with formalin, an aqueous solution of hydrochloric acid, water, etc. prior to the addition.

The temperature of the HCl-aldehyde bath with or without the nitrogen-containing compound dissolved therein, to which the phenol or both the phenol and the nitrogen-containing compound (or the diluted solution thereof) are to be added is suitably not more than 90° C., preferably not more than 70° C. If the temperature of the bath is higher than 40° C., especially higher than 50° C., the rate of the reaction of the phenol or the nitrogen-containing compound with aldehyde increases, it is preferred to add the phenol or both the phenol and the nitrogen-containing compound as a solution diluted with formalin. Furthermore, since the rate of the reaction is high, it is preferred to add the phenol, or both the phenol and the nitrogen-containing compound, preferably a diluted solution thereof as fine streams or smallest possible droplets to the bath.

When the phenol or both the phenol and the nitrogen-containing compound are added to the bath having a temperature of more than 40° C., especially more than 50° C., the rate of the reaction of the phenol and the nitrogen-containing compound becomes higher as the temperature of the bath becomes higher. Thus, within several minutes or instantaneously after the contacting, white suspended particles form and are rapidly developed into a granular or powdery solid.

A granular or powdery solid obtained by adding the phenol or both the phenol and the nitrogen-containing compound, either as such or as a diluted solution thereof, preferably a water diluted solution thereof, to the HCl-aldehyde bath maintained at not more than 40° C., preferably 5° to 35° C., especially preferably 10° to 30° C., and after the formation of white suspended particles, completing the desired reaction at not more than about 50° C., preferably not more than 45° C. shows heat fusibility in the 100° C. fusibility test to be described below because its curing reaction has not proceeded to a great extent.

On the other hand, a granular or powdery solid obtained by adding substantially all of the phenol or the phenol and the nitrogen-containing compound or the diluted solution thereof to the HCl-aldehyde bath maintained at not more than 45° C., preferably 15° to 35° C. with stirring to form a clear solution, thereafter forming white suspended particles without stirring, then forming a granular or powdery solid with or without temperature elevation, and heating the solid at a temperature higher than 50° C., preferably 70° to 95° C., to complete the desired reaction has little or substantially no heat fusibility at 100° C., or shows heat fusibility at a higher temperature, for example at 200° C., or has substantially no heat fusibility at such a high temperature.

When both the phenol and the nitrogen-containing compound are used, it is possible in both of the abovedescribed cases to first add the nitrogen-containing compound to the HCl-formaldehyde bath and then add the phenol alone.

Phenol is most preferred as the phenol. The phenol may also be a mixture of at least 50% by weight, preferably at least 70% by weight, of phenol with at least one known phenol derivative such as o-cresol, m-cresol, p-cresol, bisphenol A, bisphenol S, o-, m- or p-($C_2$–$C_4$ alkyl)-phenols, p-phenylphenol, xylenol, resorcinol and hydroquinone.

Suitable formaldehyde supply sources for the HCl-aldehyde bath include formalin, trioxane, tetraoxane and paraformaldehyde.

The HCl-aldehyde bath used in this invention may include up to 10% by weight of an aldehyde other than formaldehyde in addition to the aforesaid formaldehyde supply sources. Examples of suitable other aldehydes are mono-functional aliphatic aldehydes having 2 to 4 carbon atoms, glyoxal, furfural and benzaldehyde. Examples of the mono-functional aliphatic aldehydes include acetaldehyde, propionaldehyde, n-butyl aldehyde and iso-butyl aldehyde. These aldehydes may be used singly or as a mixture or two or more.

The nitrogen-containing compound used in this invention is a compound containing at least two active hydrogens in the molecule. Preferably, it contains in the molecule at least one group having active hydrogens selected from the class consisting of amino groups, amide groups, thioamide groups, ureylene groups and thioureylene groups. Examples of such nitrogen-containing compound are urea, thiourea, methylol derivatives of urea or thiourea, aniline, melamine, guanidine, guanamine, dicyandiamide, fatty acid amides, polyamides, toluidine, cyanuric acid, and functional derivatives of these compounds. They may be used either singly or as a mixture of two or more.

The granular or powdery resin solid formed in the bath as a result of the completion of the desired reaction is separated from the HCl-aldehyde bath, washed with water, preferably treated with an aqueous alkaline solution such as aqueous ammonia or a methanolic aqueous ammonia solution to neutralize the adhering hydrochloric acid, and again washed with water to give the desired product. As a matter of course, a resin having a relatively high solubility in methanol is preferably neutralized with an aqueous alkaline solution.

The composition of this invention comprises the aforesaid phenol-aldehyde resin and a powdery inorganic material.

The granular or powdery phenol-aldehyde resin used in this invention has good miscibility with the powdery inorganic material since it is composed of very fine particles consisting of spherical primary particles and secondary agglomerates thereof having a particle diameter of 0.1 to 150 microns.

The composition of this invention contains the granular or powdery phenol-aldehyde resin in an amount of less than 11% by weight, preferably 0.2 to 8% by weight, especially preferably 0.4 to 5% by weight, based on the total weight of the granular or powdery phenol-aldehyde resin and the inorganic powdery material.

Although the composition of this invention contains such a relatively small proportion of the granular or powdery phenol-aldehyde resin, it can be provided as an intimate mixture since this fine granular or powdery resin has good miscibility with the powdery inorganic material.

The granular or powdery phenol-aldehyde resin used in this invention may be the aforesaid phenol-aldehyde resin which at least partly fuses when maintained at a temperature of 100° C. for 5 minutes in accordance with the heat fusibility testing method, or the aforesaid phenol-aldehyde resin which does not substantially melt or fuse in the same heat fusibility test. Preferably, the granular or powdery phenol-aldehyde resin used in this invention is the aforesaid heat-fusible type, or a mixture of the heat-fusible type and the heat-infusible type.

The composition of this invention containing the heat-fusible phenol-aldehyde resin is a preferred composition because the resin melts upon heating and serves as a binder for the powdery inorganic material.

The powdery inorganic material used in the composition of this invention is a powder of a material composed of a compound generally called an inorganic material. Examples are powders of inorganic compounds capable of becoming raw materials for ceramics, and metals having a lower ionizing tendency than magnesium.

These inorganic materials may be used singly or as a mixture of two or more, and the metals may be in the form of a mixture or alloy.

Examples of the inorganic compounds capable of becoming raw materials for ceramics include metal oxides, compositions containing metal oxides as a main ingredient, metal hydroxides, metal sulfides, metal carbides, metal nitrides, inorganic acid salts of metals, and inorganic complx salts or double salts of metals. The metals in these inorganic compounds should be interpreted in the broadest sense and understood to include elements of the 2nd to 7th periods of Groups I to III of the periodic table, elements of the 3rd to 7th periods of Group IV, metal elements of the 4th to 7th periods of Groups V to VI, elements of the 4th to 6th periods of Group VIIa, and elements of Group VIII.

Specific examples of the metal oxides are beryllium oxide, boron oxide, magnesium oxide, barium oxide, alumina, silica, silica-alumina (including various zeolites), zinc oxide, titanium oxide, zirconium oxide, indium oxide, antimony oxide, and molybdenum oxide.

Specific examples of the compositions containing metal oxides as a main ingredient are clay, kaolin, pyrophyllite, montmorillonite (bentonite), clay-like mica, talc, red iron oxide, feldspar, potter's stone, pumice, volcanic ash, balloons, volcanic rock, sillimanite, mullite, zircon, rutile, anatase, hematite, beryl, asbestos, glass and cement.

Specific examples of the metal hydroxide include aluminum hydroxide, calcium hydroxide, hydrated copper carbonate (malachite), magnesium hydroxide silicate, iron hydroxide, barium hydroxide, and magnesium hydroxide.

Specific examples of the metal sulfides are zinc sulfide (sphalerite or wurtzite), antimony sulfide (stibnite), calcium sulfide, silver sulfide, cobalt sulfide, iron sulfide, copper sulfide, and barium sulfide.

Specific examples of the metal carbides are silicon carbide, zirconium carbide, tungsten carbide, titanium carbide, iron carbide, vanadium carbide, hafnium carbide, and boron carbide.

Specific examples of the metal nitrides are silicon nitride, calcium nitride, zirconium nitride, titanium nitride, niobium nitride, vanadium nitride and boron nitride.

Specific examples of the inorganic acid salts, inorganic complex salts or inorganic double salts of metals are salts containing a sulfuric acid radical, such as aluminum sulfate, potassium alum, sodium alum, cadmium sulfate, calcium sulfate (anhydrous, hemihydrate, dihydrate), strontium sulfate, anhydrous sodium sulfate, lead sulfate, barium sulfate and magnesium sulfate; halides such as sodium chloride, silver chloride, potassium chloride, cobalt chloride, iron chloride, copper chloride, platinum chloride, barium chloride, aluminum fluoride, calcium fluoride, silver fluoride, silver bromide, silver iodide and copper iodide; salts containing a phosphoric acid radical, such as zinc phosphate, aluminum phosphate, calcium phosphate, cerium phosphate, iron phosphate, magnesium phosphate, and barium phosphate; carbonate salts such as calcium carbonate, chromium carbonate, cobalt carbonate, magnesium carbonate, calcium magnesium carbonate (dolomite), barium carbonate and strontium carbonate.

Specific examples of the metals having a lower ionizing tendency than magnesium are Cu, Ag, Au, Zn, B, Al, Si, Ti, Zr, Hf, Sn, W, Mn, Fe, Co, Ni, Ru, Rh, Pd, Os, Ir and Pt.

These powdery inorganic materials used in this invention usually have such a size that they pass through a sieve of 20 Tyler's mesh, preferably 32 Tyler's mesh, more preferably 100 Tyler's mesh.

The composition of this invention can be prepared by physically mixing a predetermined amount of the granular or powdery phenol-aldehyde resin with a predetermined amount of the powdery inorganic material. The resin and the powdery inorganic material may be mixed directly in a dry condition by using a V-type blender, for example. Or they may be mixed in the presence of an auxiliary material.

The composition of this invention will now be described according to its embodiments.

Generally, the composition of this invention is molded into a shape suitable for its end use, and as required, cured or calcined to provide a product suitable for its end use. Hence, the composition of this invention includes various embodiments depending upon the operation of mixing the granular or powdery resin with the powdery inorganic material, the operation of molding the composition, and the optional operation of curing or calcining the molded article.

Generally, the composition of this invention is prepared by mixing predetermined amounts of the granular or powdery resin and the powdery inorganic material. Since the granular or powdery resin used in this invention is composed of very fine particles containing spherical primary particles having a particle diameter of 0.1 to 150 microns, there can be obtained a composition in which these particles are relatively uniformly mixed in spite of the small amount of the granular or powdery resin used. When only the mixing operation is considered, the composition of this invention as a uniform mixture can be produced by dry or wet mixing.

But when the molding operation, etc. are additionally considered, the composition of this invention can be provided preferably as a composition containing an auxiliary agent preferably by performing the mixing operation in the presence of the auxiliary agent. Sometimes, it is preferred to provide the composition in such a state.

A first embodiment of the composition of this invention is a composition which contains the granular or powdery resin showing heat fusibility upon heating and is substantially free from a binder component besides the aforesaid resin. This component can be converted to a molded article having self-supporting property and a fixed shape by filling a predetermined amount of the composition in a mold and heating it at an elevated pressure of, for example, 50 to 1,000 kg/cm$^2$ to a temperature above a point at which the resin melts, for example to a temperature above 60° C. whereby the resin acts as a binder. The resulting molded article is provided as a cured product either as such when the curing reaction of the resin has already proceeded sufficiently, or after it is cured when the curing reaction of the resin has not yet proceeded sufficiently. Furthermore, the molded article or the cured article can be provided as a calcined product by subjecting it to calcination.

The composition of this invention in accordance with the first embodiment which is suitable for providing cured products contains a metal oxide, a mineral having a metal oxide as a main ingredient, a metal hydroxide, a metal sulfide or a metal as the inorganic material. The composition of this invention in accordance with the first embodiment which is suitable for providing calcined products contains a mineral containing a metal oxide as a main ingredient, a metal carbide, a metal nitride or a metal as the inorganic material.

A second embodiment of the composition of this invention is a composition containing the granular or powdery resin which does not show heat fusibility upon heating and does not contain or substantially contain a binder component. Since the resin does not show heat fusibility upon heating, it is difficult to convert only by heating to this composition to a molded article having self-supporting property and a definite shape. However, since the composition of this invention is composed of the very fine granular or powdery resin composed of primary particles having a particle diameter of 0.1 to 100 microns and the powdery inorganic material, it can be converted to a molded article having self-supporting property and a definite shape by compressing it under very high pressures. Specifically, the composition according to the second embodiment can be converted to a molded article having self-supporting property and a definite shape by filling a predetermined amount of the composition into a mold of a definite shape and applying a pressure of several hundred kilograms to several tens of tons/cm$^2$, if required under heating.

The resulting molded article is calcined, as required, and is usually provided as a calcined product. Preferred compositions of the invention in accordance with the second embodiment are the same as those exemplified with regard to the first embodiment.

A third embodiment of the composition of this invention is a composition in which the granular or powdery resin may, or may not, show heat fusibility upon heating, but which contains an auxiliary component capable of becoming a binder in addition to the aforesaid resin even when the resin shows heat fusibility. Since this composition contains the auxiliary component capable of becoming a binder, it can be converted to a molded article having self-supporting property and a definite shape without particularly heating or pressing it. Water, for example, is preferably used as such an auxiliary component capable of becoming a binder. Since, however, the granular or powdery resin used in this invention generally has a lower specific gravity than the powdery inorganic material, it is undesirable to use water in such a large amount which will readily cause separation between the resin and the inorganic powdery material. The proper amount of water used depends upon the kind and amount of the powdery inorganic material and the amount of the resin used. Desirably, water is used in such an amount that the composition becomes a self-supporting slurry. As one standard, the amount of water may be the volume in cc of water which is less than the three fold value of the actual volume of solid materials used (the total in cc of the quotients of the amounts in grams of the individual solids used divided by their densities in g/cc).

In addition to water, various binder materials well known in the ceramics technology can be used besides water. Examples of the other binder materials include, asphalt, synthetic lac, stearic acid, pine oil, naphtha, pine tar, glycerol, ethyl cellulose, abietic acid resin, polyvinyl butyral and starch. Such a binder material can be used usually in an amount of not more than 5 parts by weight per 100 parts by weight of the solid materials used.

When, for example, a raw material for refractories such as porcelains, ceramics or bricks or a powder such as cement is used as the powdery inorganic material in the production of a cured molded article from the composition of this invention, water becomes an essential component for the proceeding of the curing reaction. Thus, it is understood that the use of water as an auxiliary component is necessary.

When a calcined molded article is produced from the composition of this invention, it is desirable to use a sintering aid required for production of the calcined product, for example boron used for the production of a sintered article of silicon carbide. The composition of this invention can contain such a sintering aid. These sintering aids are well known in the art.

When a porous calcined article is to be produced from the composition of this invention, it is desirable to include a pore-forming agent which can readily be decomposed during calcination. Examples of the pore-forming material include carbohydrates such as cellulose (rayon), starch and sugar; derivatives of carbohydrates such as carboxymethyl cellulose, hydroxyethyl cellulose and acetyl cellulose; natural materials containing carbohydrates as a main ingredient, such as wood flour, linter, coconut shell, chaff and grain flours; and thermoplastic resins such as polyamides, polyvinyl acetate, vinyl chloride resins, vinylidene chloride resins and polyacrylonitrile resins; and heat-infusible resins such as polyvinyl alcohol and polyvinyl formal. The composition of this invention may contain such a pore-forming agent.

Since the composition of this invention contains the granular or powdery phenol-aldehyde resin having reactivity with itself or with another resin and composed of very fine particles with a high surface area, the resin and the powdery inorganic material are dispersed in each other uniformly and the resin acts as a heat-curable binder or as a carbon source for calcination by heating. Consequently, the composition of this invention gives a cured product which is substantially uniformly cured even to its interior, and scarcely gives a calcined product having cracks or gas blisters.

The inorganic molded articles obtained from the composition of this invention have excellent mechanical properties such as high impact strength, excellent electrical properties, heat resistance, abrasion resistance, sliding characteristics and chemical resistance.

The cured articles and calcined articles obtained from the composition of this invention can be used, for example as component parts of vehicles, aircraft and ships such as brakes, plugs, gears and bearings; component parts of electrical and energy machinery such as radio wave absorbers, condensers, electric resistances, battery insulators, heat generators, protective tubes for sensors, and heat insulating materials; irregularly shaped refractories, such as wall materials for various furnaces such as a blast furnace and a converter, fireproof paints, and fireproof pads; medical materials such as dental materials and bone materials, machine parts such as various tools, sliding members (e.g., bearings, yarn guides, seals, etc.), frictional materials (e.g., polishing agents, polishing powders, brakes, etc.), anticorrosive materials; building and civil engineering materials such as bridgeheads, tetrapods, ties or sleepers, roadbeds, piles, autoclaved lightweight concrete (ALC), fire-resistant materials, heat insulating materials, moisture-absorbing materials, boards and partitioning walls; and industrial materials such as electrodes, refractory bricks and tapping troughs.

The following examples illustrate the present invention more specifically.

The various properties given in the specification including the following examples are measured or defined as follows:

1. Content of particles having a specified particle diameter

A portion weighing about 0.1 g was taken from five different sites of one sample.

A part of each of the 0.1 g portions so taken was placed on a slide glass for microscopic examination. The sample on the slide glass was spread to minimize accumulation of particles for easy observation.

The microscopic observations was made with regard to that part of the sample in which about 10 to about 50 primary particles and/or the secondary agglomerated particles thereof were present in the visual field of an optical microscope usually having a magnification of 100 to 1,000. The sizes of all particles existing in the visual field of the optical microscope were read by a measure set in the visual field of the optical microscope and recorded.

The content (%) of particles having a size of, for example, 0.1 to 150μ can be calculated in accordance with the following equation.

$$\text{Content (\%)} = \frac{N_1}{N_o} \times 100$$

$N_o$: the total number of particles whose sizes were read in the visual field under the microscope, and
$N_1$: the number of those particles in $N_o$ which had a size of 0.1 to 150μ.

For each sample, the average of values obtained from the five sampled portions was calculated.

2. Proportion of particles which passed through a Tyler mesh sieve

About 10 g of a dried sample, being if desired after lightly crumpled by hand, was accurately weighed. Over the course of 5 minutes, the sample was put little by little in a Tyler mesh sieve vibrator (the opening size of the sieve 200 mm in diameter; vibrating speed 200 rpm). After the end of addition, the sieve was vibrated further for 10 minutes. The proportion of the particles which passed through a 100 Tyler mesh sieve, for example, was calculated from the following equation.

$$(\% \text{ by weight}) = \frac{\omega_o - \omega_1}{\omega_o} \times 100$$

$\omega_o$: the amount of the sample put in the sieve (g),
$\omega_1$: the amount of the sample which remained on the 100 Tyler mesh sieve (g).

3. Free phenol content

About 10 g of the sample which passed through the 100 Tyler mesh sieve was precisely weighed, and heat-treated under reflux for 30 minutes in 190 g of 100% methanol. The heat-treated product was filtered through a No. 3 glass filter. The filtrate was subjected to high-performance liquid chromatography to determine the phenol content of the filtrate. The free phenol content of the sample was determined from a calibration curve separately prepared.

The operating conditions of high-performance liquid chromatography were as follows:
Device: Model 6000 A made by Waters Co., U.S.A.
Column carrier: μ-Bondapak $C_{18}$
Column: ¼ inch in diameter and 1 foot in length
Column temperature: room temperature
Eluent: methanol/water (3/7 by volume)
Flow rate: 0.5 ml/min.
Detector: UV (254 nm), range 0.01 (1 mV)

The phenol content of the filtrate was determined from a separately prepared calibration curve (showing the relation between the phenol content and the height of a peak based on phenol).

Figure 2:
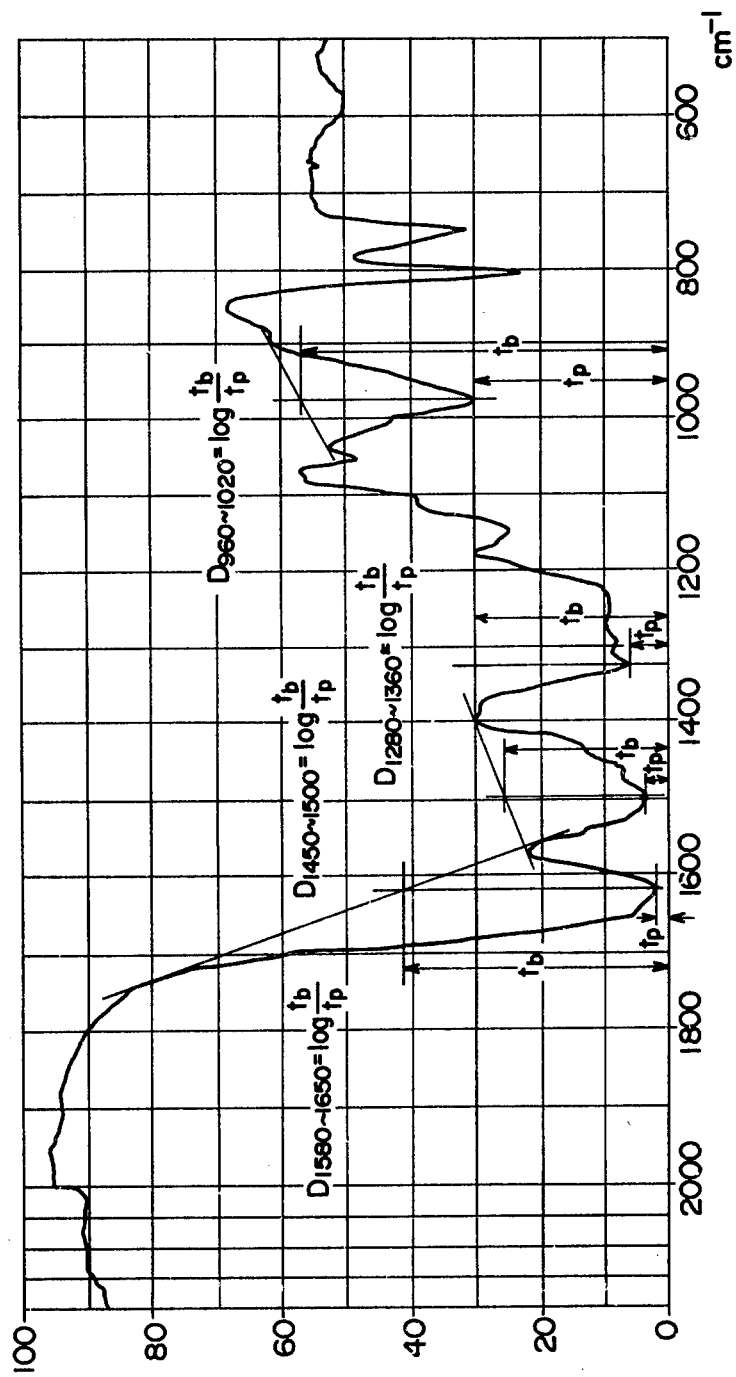

Infrared absorption spectrum and absorption intensities (see accompanying FIGS. 1 and 2)

The infrared absorption spectrum of a sample prepared by a usual KBr tablet method was measured by means of an infrared spectrophotometer (Model 225 made by Hitachi Limited).

The absorption intensity at a specified wavelength was determined in the following way.

A base line is drawn tangent to a peak whose absorption intensity is to be determined in the measured infrared absorption spectral chart. Let the transmittance of the vertex of the peak be $t_p$ and the transmittance of the base line at the specified wavelength be $t_b$, then the absorption intensity D at the specified wavelength is given by the following equation.

$$D = \log \frac{t_b}{t_p}$$

For example, the ratio of the absorption intensity of a peak at 890 cm$^{-1}$ to that of a peak at 1600 cm$^{-1}$ is given by the ratio of the respective absorption intensities determined by the above equation (i.e., $D_{890}/D_{1600}$).

5. Heat fusibility at 100° C.

About 5 g of a sample which passed through a 100 Tyler mesh sieve was interposed between two 0.2 mm-thick stainless steel sheets, and the assembly was pressed under an initial pressure of 50 kg for 5 minutes by means of a hot press kept at 100° C. (single acting compression molding machine manufactured by Shinto Kinzoku Kogyosho Co., Ltd.). The press was released, and the hot-pressed sample was taken out from between the two stainless steel sheets, and observed. When the sample so taken out was in the form of a flat plate as a result of melting or melt-adhesion, it was judged that the sample had fusibility. When no appreciable difference was noted after the hot pressing, the sample was determined to have infusibility.

6. Methanol solubility

About 10 g of a sample was precisely weighed (the precisely measured weight is given by $W_o$), and heat-treated under reflux for 30 minutes in about 500 ml of 100% methanol. The mixture was filtered on a No. 3 glass filter. The sample remaining on the filter was washed with about 100 ml of methanol. Then, the sample remaining on the filter was dried at 70° C. for 2 hours. The weight of the dried sample was precisely weighed (the precisely measured weight is given by $W_1$). The solubility of the sample in methanol was calculated from the following equation.

$$\text{Solubility in methanol (wt \%)} = \frac{W_o - W_1}{W_o} \times 100$$

7. Hydroxyl value

Measured in accordance with the method of measuring the hydroxyl value (General Testing Method 377, Commentary on the Standards of Cosmetic Materials, first edition, published by Yakuji Nipposha, 1975).

8. Bulk density

A sample was poured into a 100 ml measuring cylinder (whose brim corresponded to a 150 ml indicator mark) from a height 2 cm above the brim of the measuring cylinder. The bulk density of the sample is defined by the following equation.

$$\text{Bulk density (g/ml)} = \frac{W \text{ (g)}}{100 \text{ (ml)}}$$

W: the weight in grams of the sample per 100 ml.

9. Hardness of a calcined article

Measured by a Vicker's method microhardness tester uner a load of 500 kg.

10. Flexural strength and compression strength

Measured in accordance with JIS K-6911-1979.

11. Thermal conductivity

Measured in accordance with JIS-A-1412-1968.

12. Specific electric resistance

Measured by a voltage drop method in accordance with JIS-R-7202.

13. Apparent density

The size of a molded article was measured by slide calipers and its volume was determined. The apparent density of the molded article was calculated from its volume and weight.

REFERENTIAL EXAMPLE 1

(1) In each run, a 2-liter separable flask was charged with 1,500 g of a mixed aqueous solution at 28° C. of hydrochloric acid and formaldehyde having each of the compositions shown in Table 1, and 62.5 g of an aqueous solution at 25° C. containing 80% by weight of phenol and 5% by weight of formaldehyde prepared from 98% by weight of phenol (the remaining 2% by weight being water), 37% formalin and water was added. The mixture was stirred for 20 seconds, and then left to stand for 60 minutes. During the 60-minute standing, the contents of the flask remained clear (Runs Nos. 1 and 20), or turned from a clear solution to a whitely turbid suspension (Runs Nos. 3, 9 and 18), or turned from a clear solution to a whitely turbid suspension which then turned pale pink (Runs Nos. 2, 4 to 8, 10 to 17, and 19). Microscopic observation showed that the pink-colored suspensions already contained spherical particles, agglomerated spherical particles, and a small amount of a powder. With occasional stirring, the contents of the separable flask were heated to 80° C. over the course of 60 minutes, and then maintained at 80° to 82° C. for 15 minutes to obtain a reaction product. The reaction product was washed with warm water at 40° to 45° C., treated in a mixed aqueous solution containing 0.5% by weight of ammonia and 50% by weight of methanol at 60° C. for 30 minutes, again washed with warm water at 40° to 45° C., and then dried at 80° C. for 2 hours. The properties of the reaction products obtained by using the aqueous solutions of hydrochloric acid and formaldehyde in various proportions are shown in Table 2.

(2) For comparison, the following experiment was carried out. A 1-liter separable flask was charged with 282 g of distilled phenol, 369 g of 37% by weight formalin and 150 g of 26% by weight aqueous ammonia and with stirring, the mixture was heated from room temperature to 70° C. over 60 minutes. Furthermore, the mixture was stirred at 70° to 72° C. for 90 minutes, and then allowed to cool. While 300 g of methanol was added little by little, the product was dehydrated by azeotropic distillation under a reduced pressure of 40 mmHg. As a solvent, 700 g of methanol was added, and the product was withdrawn as a yellowish brown clear solution of a resol resin.

When the solvent was removed from a part of the resulting resol resin under reduced pressure, vigorous foaming occurred and the resin was gelled. The gel was heat-cured under a nitrogen gas atmosphere at 160° C. for 60 minutes, and the resulting cured foam was pulverized to obtain a small amount of a powder which passed through a 100 Tyler mesh sieve. The heat-cured resol was very hard and extremely difficult to pulverize into a powder having a size of 100-mesh under even when various types of pulverizers or ball mills or a vibratory mill for fluorescent X-rays were used. The resulting heat-cured resol resin powder was treated with a mixed aqueous solution containing 0.5% by weight of ammonia and 50% by weight of methanol, washed with warm water, dehydrated and then dried under the same conditions as described in section (1) above. The properties of the resulting product are shown in Table 2 as Run No. 21.

A 1-liter separable flask was charged with 390 g of phenol, 370 g of 37% by weight formalin, 1.5 g of oxalic acid and 390 g of water, and with stirring, the mixture was heated to 90° C. over 60 minutes and heated with stirring at 90° to 92° C. for 60 minutes. Then, 1.0 g of 35% by weight hydrochloric acid was added, and the mixture was further heated with stirring at 90° to 92° C. for 60 minutes. The product was cooled by adding 500 g of water, and then the water was removed by a siphon. The residue was heated under a reduced pressure of 30 mmHg, and heated under reduced pressure at 100° C. for 3 hours and then at 180° C. for 3 hours. On cooling, a novolak resin was obtained as a yellowish brown solid having a softening temperature of 78° to 80° C. and a free phenol content, measured by liquid chromatography, of 0.76% by weight. It has a methanol solubility of 100% by weight.

The resulting novolak resin was pulverized and mixed with 15% by weight of hexamethylenetetramine. The mixture was heat-cured in a nitrogen gas at 160° C. for 120 minutes, pulverized in a ball mill, and then passed through a 100 Tyler mesh sieve. The resulting powder was treated with a mixed aqueous solution containing 0.5% by weight of ammonia and 50% by weight of methanol, washed with water, dehydrated and then dried under the same conditions as described above. The properties of the resulting product are shown in Table 2 as Run No. 22.

The novolak resin was melt-spun at 136° to 138° C. through a spinneret having 120 orifices with a diameter of 0.25 mm. The as-spun filaments having an average size of 2.1 denier were dipped in a mixed aqueous solution containing 1.8% by weight of hydrochloric acid and 18% by weight of formaldehyde at 20° to 21° C. for 60 minutes, heated to 97° C. over 5 hours, and then maintained at 97° to 98° C. for 10 hours. The resulting cured novolak fibers were treated with a mixed aqueous solution containing 0.5% by weight of ammonia and 50% by weight of methanol, washed with water, dehydrated and then dried under the same conditions as described above. The product was pulverized in a ball mill, and passed through a 100 Tyler mesh sieve. The properties of the resulting product are shown in Table 2 as Run No. 23.

(3) Table 1 shows the concentrations of hydrochloric acid and formaldehyde used and the total concentration of hydrochloric acid and formaldehyde, and the mole ratio of formaldehyde to phenol. Table 2 shows the contents of particles having a size of 1 to 50 microns, 1 to 100 microns, and 1 to 150 microns, respectively, the proportion of particles which passed through a 100 Tyler mesh sieve, and the $D_{990-1015}/D_{1600}$ and $D_{890}/D_{1600}$ ratios of the resulting products.

TABLE 1

| Run No. | Concentration (wt. %) HCl | Formaldehyde | Total | Mole ratio of formaldehyde to phenol |
|---|---|---|---|---|
| 1 | 3 | 1 | 4 | 1.1 |
| 2 | 3 | 25 | 28 | 23.8 |
| 3 | 5 | 5 | 10 | 4.9 |
| 4 | 5 | 10 | 15 | 9.6 |
| 5 | 5 | 22 | 27 | 20.9 |
| 6 | 7 | 30 | 37 | 28.5 |
| 7 | 10 | 6 | 16 | 5.8 |
| 8 | 10 | 20 | 30 | 19.1 |
| 9 | 12 | 3 | 15 | 2.8 |
| 10 | 15 | 5 | 20 | 4.9 |
| 11 | 15 | 25 | 40 | 23.8 |
| 12 | 18 | 10 | 28 | 9.6 |
| 13 | 20 | 7 | 27 | 16.8 |
| 14 | 22 | 4 | 26 | 4.0 |
| 15 | 22 | 17 | 39 | 16.2 |
| 16 | 25 | 6 | 31 | 5.8 |
| 17 | 25 | 25 | 50 | 23.8 |
| 18 | 28 | 3 | 31 | 2.8 |
| 19 | 28 | 7 | 35 | 6.8 |
| 20 | 33 | 1 | 34 | 1.1 |
| 21 | Heat cured resol resin | | | |
| 22 | Hexamine heat-cured novolak resin | | | |
| 23 | Cured novolak fibers | | | |

In Runs Nos. 1, 2, 3, 6, 17 and 20 shown in Table 1, a large amount of a sticky resin or a hard and large lumpy or plate-like mass formed at the bottom of the separable flask. In Runs Nos. 1, 2 and 20, only less than 49 g of a solid was obtained from 50 g of phenol used.

In Runs Nos. 1, 2, 3, 6, 17 and 20, the contents of particles having a size of 1 to 50 microns, 1 to 100 microns and 1 to 150 microns and the proportion of particles having a size of 100 mesh under shown in Table 2 are based on the entire solid including the sticky resin, lumpy mass and plate-like mass. The contents of these particles and the proportion of particles having a size of 100 mesh under based only on the granular and powdery product in these Runs are shown in the parentheses in Table 2.

FIG. 1 shows an infrared absorption spectral chart of the granular or powdery product obtained in Run No. 12, and also illustrates how to determine $t_p$ and $t_b$, which are required in obtaining the absorption intensity D, from the infrared absorption spectral chart. A base line is drawn across a certain peak, and $t_p$ and $t_b$ can be determined at the wavelength of the peak as illustrated.

REFERENTIAL EXAMPLE 2

Each of six 20-liter reaction vessels was charged with 10.24 to 11.65 kg of a mixed aqueous solution containing 20% by weight of hydrochloric acid and 11% by weight of formaldehyde so that the bath ratio was as shown in Table 3. With stirring at 23° C., a mixed aqueous solution containing 90% by weight of phenol and 3.7% by weight of formaldehyde was added in an amount of 1.8 kg, 1.5 kg, 0.9 kg, 0.7 kg, 0.4 kg, and 0.25 kg, respectively. The bath ratios were 7.3, 8.5, 13.5, 17.0, 28.9, and 45.6, respectively.

In all of these cases, continued stirring after addition of the mixed aqueous phenol solution resulted in the abrupt formation of white suspended particles in 40 to 120 seconds. The stirring was stopped as soon as the white suspended particles formed, and the suspension

TABLE 2

| Run No. | Content (%) of particles having the following sizes 1–50μ | 1–100μ | 1–150μ | Proportion of particles having a size of 100 mesh under (wt. %) | IR intensity ratio $D_{990-1015}/D_{1600}$ | $D_{890}/D_{1600}$ |
|---|---|---|---|---|---|---|
| 1 | 1 (76) | 1 (100) | 1 (100) | 1 (83) | 0.35 | 0.10 |
| 2 | 3 (73) | 3 (100) | 3 (100) | 4 (79) | 0.45 | 0.11 |
| 3 | 13 (87) | 13 (100) | 13 (100) | 8 (75) | 0.42 | 0.11 |
| 4 | 50 | 89 | 96 | 62 | 0.86 | 0.18 |
| 5 | 53 | 97 | 100 | 63 | 4.82 | 0.73 |
| 6 | 12 (76) | 12 (100) | 12 (100) | 18 (84) | 6.68 | 1.02 |
| 7 | 61 | 98 | 100 | 63 | 0.23 | 0.10 |
| 8 | 83 | 100 | 100 | 78 | 2.36 | 0.58 |
| 9 | 61 | 92 | 100 | 61 | 0.21 | 0.14 |
| 10 | 83 | 100 | 100 | 76 | 0.25 | 0.11 |
| 11 | 63 | 81 | 100 | 61 | 4.83 | 0.46 |
| 12 | 99 | 100 | 100 | 98 | 1.52 | 0.40 |
| 13 | 99 | 100 | 100 | 91 | 0.83 | 0.25 |
| 14 | 69 | 94 | 100 | 69 | 0.26 | 0.17 |
| 15 | 54 | 75 | 92 | 71 | 2.16 | 0.64 |
| 16 | 84 | 98 | 100 | 79 | 0.37 | 0.12 |
| 17 | 10 (86) | 10 (94) | 10 (100) | 2 (73) | 4.26 | 0.13 |
| 18 | 50 | 87 | 96 | 62 | 0.27 | 0.10 |
| 19 | 59 | 93 | 100 | 69 | 0.44 | 0.10 |
| 20 | 2 (52) | 2 (95) | 2 (100) | 1 (61) | 0.23 | 0.10 |
| 21 | 17 | — | — | — | 0.12 | 0.09 |
| 22 | 58 | — | — | — | 5.47 | 0.07 |
| 23 | 39 | — | — | — | 0.87 | 0.23 | was left to stand for 3 hours. The temperature of the inside of the reaction system gradually rose, and the contents of the vessel gradually turned pale pink. In all of these runs, the formation of a slurry-like or resin-like product was observed in 30 minutes after the formation of the white suspended particles. The reaction mixture was washed with water with stirring. With stirring, the contents of the flask were heated to 75° C. over 2 hours, and then heated with stirring at 75° to 76° C. for 30 minutes. With the reaction mixture obtained in a system having a bath ratio of 7.3, a large amount of resin melt-adhered to the stirring rod and the stirring became very difficult. In all runs, the contents of the reaction vessel turned from pale pink to pink and further to red during the temperature elevation.

The contents of the flask were then washed with water, treated in a mixed aqueous solution containing 0.1% by weight of ammonia and 55% by weight of methanol at 50° C. for 60 minutes, and washed with warm water at 80° C. for 60 minutes. The resulting granular or powdery product or lumpy mass was crumpled lightly by hand, and dried at 100° C. for 2 hours. After the drying, the product had a water content of less than 0.2% by weight. The resulting products are designated as samples of Runs Nos. 31, 32, 33, 34, 35 and 36 in the increasing order of the bath ratio.

Table 3 summarizes the maximum temperature reached of the reaction system from the initiation of the reaction to 3 hours after the formation of the white suspended particles; the yield of the reaction product; the presence or absence of spherical primary particles by microscopic observation; the proportion and bulk density of particles having a size of 100 Tyler mesh under in the reaction product; the heat fusibility at 100° C. of the reaction product; the elemental analysis values of the product; and the OH value of the product.

uct is included within the granular or powdery resin used in this invention.

In Runs Nos. 31 to 36, almost all of the granular or powdery product consisted of particles having a size of 1 to 100 microns.

REFERENTIAL EXAMPLE 3

One thousand grams of a mixed aqueous solution at 25° C. containing 18% by weight of hydrochloric acid and 9% by weight of formaldehyde was put into each of six 1-liter separable flasks. The room temperature was 15° C. With stirring, 40 g of phenol diluted with 5 g of water was added at a time to the solution. In each run, the stirring was stopped in 50 seconds after the addition of the diluted solution of phenol. In 62 to 65 seconds after the stopping of the stirring, while suspended particles abruptly formed to give a milk-white product. The milk-white product gradually turned pink. The temperature of the liquid gradually rose from 25° C., reached a maximum temperature of 35° to 36° C. in 16 to 17 minutes after the addition, and then dropped. The reaction mixture was allowed to stand at room temperature for 0.5 hour (Run No. 41), 1 hour (Run No. 42), 2 hours (Run No. 43), 6 hours (Run No. 44), 24 hours (Run No. 45), and 72 hours (Run No. 46), respectively, washed with water, treated in 1% by weight aqueous ammonia at 15° to 17° C. for 6 hours, washed with water, dehydrated, and finally dried at 40° C. for 6 hours.

Table 4 summarizes the proportion of particles which passed through a 100 Tyler mesh sieve, the $D_{990\text{-}1015}/D_{1600}$ ratio and $D_{890}/D_{1600}$ ratios, the methanol solubility and the free phenol content of the products.

The samples obtained in Runs Nos. 41 to 46 all fused at 60° C. in a heat fusibility test.

FIG. 2 shows an infrared absorption spectral chart of the granular or powdery resin obtained in Run No. 44.

TABLE 3

| Run No. | Bath ratio | Maximum temperature reached of the reaction system (°C.) | Yield (wt. %) | Proportion of the 100 mesh under particles (wt. %) | Bulk density of the 100 mesh under particles | Presence absence of spherical primary particles | Heat-fusibility at 100° C. | Elemental analysis (wt. %) | | | | OH value |
|---|---|---|---|---|---|---|---|---|---|---|---|---|
| | | | | | | | | C | H | O | N | |
| 31 | 7.3 | 39.5 | 110 | 29 | 0.25 | Little | Fused | 74.5 | 5.7 | 19.0 | 0.6 | 330 |
| 32 | 8.5 | 38.5 | 113 | 63 | 0.23 | Much | Infusible | 74.7 | 5.6 | 19.3 | 0.3 | 335 |
| 33 | 13.5 | 37.0 | 115 | 78 | 0.21 | Mostly | " | 75.0 | 5.7 | 20.0 | 0.2 | 360 |
| 34 | 17.0 | 36.5 | 118 | 91 | 0.20 | " | " | 75.1 | 5.7 | 19.1 | 0.1 | 373 |
| 35 | 28.9 | 35.5 | 118 | 98 | 0.19 | " | " | 76.3 | 5.7 | 18.7 | 0.0 | 385 |
| 36 | 45.6 | 35.0 | 117 | 97 | 0.19 | " | " | 75.7 | 5.7 | 18.3 | 0.0 | 377 |
| 21 | (Comparison; see Table 1) | | — | — | 0.67 | None | " | 78.7 | 5.7 | 14.7 | 0.7 | 235 |
| 22 | (Comparison; see Table 1) | | — | — | 0.50 | " | Fused | 78.1 | 6.0 | 13.7 | 2.3 | — |
| 23 | (Comparison; see Table 1) | | — | — | 0.27 | " | Infusible | 74.8 | 5.6 | 19.2 | 0.5 | 325 |

The OH value of the product obtained in Run No. 22 could not be measured because it fluctuated greatly.

In Run No. 31, a plate-like product and a lumpy product formed in a total amount of as large as about 70% based on the entire solid formed at the bottom of the flask, and only about 30% of the entire solid consisted of a granular or powdery product. But about 95% of the granular or powdery product passed through a 100 Tyler mesh sieve. The indication "little" for Run No. 31 is because the proportion of the granular or powdery product based on the entire solid was as small as about 30%. Hence, the method of Run No. 31 is not recommendable, but the resulting granular or powdery prod- FIG. 2 also illustrates the method of determining $t_p$ to $t_b$ required for obtaining the absorption intensity D. A base line is drawn across a certain peak, and $t_p$ and $t_b$ can be determined as illustrated at the wavelength of the peak.

TABLE 4

| Run No. | Proportion of particles which passed through a 100 Tyler mesh sieve (wt. %) | IR intensity ratio $D_{990-1015}/D_{1600}$ | $D_{890}/D_{1600}$ | Methanol solubility (wt. %) | Free phenol content (ppm) |
| --- | --- | --- | --- | --- | --- |
| 41 | 59 | 0.53 | 0.10 | 97 | 310 |
| 42 | 83 | 0.87 | 0.12 | 80 | 116 |
| 43 | 94 | 1.06 | 0.13 | 71 | 85 |
| 44 | 97 | 1.12 | 0.13 | 67 | 74 |
| 45 | 96 | 1.12 | 0.14 | 64 | 73 |
| 46 | 97 | 1.13 | 0.13 | 63 | 70 |

REFERENTIAL EXAMPLE 4

A 1000-liter reaction vessel equipped with a stirring rod was charged with 800 kg of a mixed aqueous solution at 18° C. containing 18.5% by weight of hydrochloric acid and 8.5% by weight of formaldehyde, and while the mixed aqueous solution was stirred, 36.4 kg of a 88% by weight aqueous solution of phenol at 20° C. was added. After the addition of all of the aqueous phenol solution, the mixture was stirred for 60 seconds. The stirring was then stopped, and the mixture was left to stand for 2 hours. In the reaction vessel, white suspended particles formed abruptly in 85 seconds after the addition of all of the aqueous phenol solution. The white suspended particles gradually turned pale pink, and the temperature of the suspension gradually rose to 34.5° C. and decreased. Thereafter, while the mixed aqueous solution in which the reaction product formed was stirred, a valve secured to the bottom of the reaction vessel was opened, and the contents were withdrawn and separated into the reaction product and the mixed aqueous solution of hydrochloric acid and formaldehyde by using a nonwoven fabric (Nomex, a tradename for a product of E. I. du Pont de Nemours & Co.). The reaction product was washed with water, dehydrated, dipped for a day and night in a 0.5% by weight aqueous solution of ammonia at 18° C., again washed with water, and dehydrated to give 44.6 kg of the reaction product having a water content of 15% by weight.

2.0 Kg of the reaction product so obtained was dried at 40° C. for 3 hours to give 1.7 kg of a sample (Run No. 47).

Table 5 shows the contents of 0.1–50 micron particles and 0.1–100 micron particles of the dried sample obtained, the proportion of particles which passed through a 100 mesh Tyler mesh sieve, the $D_{990-1015}/D_{1600}$ and $D_{890}/D_{1600}$ ratios, and the methanol solubility of the product.

TABLE 5

| Run No. | Content of 0.1–50 micron particles (%) | Content of 0.1–100 micron particles (%) | Proportion of particles which passed through a 100 Tyler mesh sieve (wt. %) | IR intensity ratio $D_{990-1015}/D_{1600}$ | $D_{890}/D_{1600}$ | Methanol solubility (wt. %) |
| --- | --- | --- | --- | --- | --- | --- |
| 47 | 96 | 100 | 99 | 1.18 | 0.13 | 47 |

EXAMPLE 1

Commercially available clay ("Jinseido" containing 34% by weight of water) alone (Run No. 50) or a mixture of 134 parts by weight of the above clay and 0.3 part by weight (Run No. 51), 1 part by weight (Run No. 52), 3 parts by weight (Run No. 53), 6 parts by weight (Run No. 54), 10 parts by weight (Run No. 55) or 20 parts by weight (Run No. 56) of the granular or powdery resin obtained in Run No. 35 was kneaded fully by hand. The clay alone or the kneaded mixture was molded into five molded articles using a wooden mold having a width of 15 mm, a thickness of 10 mm and a length of 100 mm. Then, these molded articles were dried at room temperature for 2 days, and ground to a shape having a width of 13 mm, a thickness of 6 mm and a length of 80 mm, and then dried in a dryer at 50° C. for 8 hours to form precursors for calcination. These precursors were placed stationary at the center of an alumina-silica furnace tube. While nitrogen gas was passed through the furnace at a rate of 5 ml/cm² of the cross sectional area of the furnace, the temperature was raised from room temperature to 1600° C. over the course of 8 hours. The precursors were then maintained at 1600° C. for 3 hours, and gradually cooled, after which the calcined test samples were taken out.

Table 6 shows the amount of the product of Run No. 35, the appearances, length retentions (based on the precursors) and flexural strengths of the calcined test samples.

TABLE 6

| Run No. | Amount of the product of Run No. 35 (parts by weight) | Calcinned test samples Appearance | Length retention (%) | Flexural strength (kg/cm²) |
| --- | --- | --- | --- | --- |
| 50 | 0 | Large gas blisters | 91.0 | 510 |
| 51 | 0.3 | Good | 91.2 | 650 |
| 52 | 1 | Good | 91.0 | 840 |
| 53 | 3 | Good | 90.6 | 810 |
| 54 | 6 | Good | 89.7 | 720 |
| 55 | 10 | Good | 89.1 | 610 |
| 56 | 20 | Good | 87.5 | 190 |

EXAMPLE 2

A composition obtained by incorporating 7 parts by weight of water in 100 parts by weight of a mixture consisting of 75 parts by weight of electrically fused alumina, 15 parts by weight of silicon carbide, 2 parts by weight of natural graphite and 8 parts by weight of metallic silicon (Run No. 57), and a composition obtained by adding 7 parts by weight of water and 5 parts by weight of the reaction product of Run No. 12 (previously passed through a 200-mesh sieve) to 100 parts by weight of the aforesaid mixture (Run No. 58) were both prepared. Each of these compositions was molded in mold under a pressure of 5 tons/cm² to produce 15 test samples each having a width of 5 mm, a thickness of 5 to 6 mm and a length of 50 mm. Then, these test samples were calcined at 800° C. in a coke furnace filled with coke powder.

Table 7 shows the compression strengths and the rate of crack occurrence of the two types of test samples obtained by the above method. The compression strength is an average value of the compression strengths of samples cut out from five test samples for each type. The rate of crack occurrence shows the number of test samples which developed cracks when 10 samples were heated to a red state by a Bunsen burner and then put in water.

TABLE 7

| Run No. | Amount of the product of Run No. 12 (parts by weight) | Calcined article Compression strength (kg/cm$^2$) | Number of samples in which cracks occurred (per 10 samples) |
|---|---|---|---|
| 57 | 0 | 230 | 5 |
| 58 | 5 | 210 | 0 |

EXAMPLE 3

A mixture of 100 parts by weight of diatomaceous earth and 7 parts by weight of the product of Run No. 47 (Run No. 59), a mixture of 100 parts by weight of diatomaceous earth and 7 parts by weight of the uncured novolak resin obtained in Run No. 22 containing 15% by weight of hexamethylenetetramine (Run No. 60), a mixture of 100 parts by weight of diatomaceous earth and 7 parts by weight of 6-nylon powder (Run No. 61), and a mixture of 100 parts by weight of diatomaceous earth and 7 parts by weight of metallic aluminum powder (Run No. 62) were each prepared. Each of these mixtures was molded by a hot press at a temperature of 250° C. and a pressure of 200 to 500 kg/cm$^2$ to make five plates having a width of 100 mm, a length of 100 mm and a thickness of 8 to 10 mm.

Table 8 summarizes the type of the binder material and the bulk density, compression strength and thermal conductivity of the resulting molded plate. Table 8 also shows the compression strength and thermal conductivity of the molded plate which had been heat-treated at 650° C. for 5 minutes in an atmosphere of nitrogen gas.

TABLE 8

| Run No. | Type of the binder | Molded plate | | Heat-treated molded plate | |
|---|---|---|---|---|---|
| | | Bulk density (g/cc) | Compression (kg/cm$^2$) | Thermal conductivity (kcal/m·hr·°C.) | Compression strength (kg/cm$^2$) | Thermal conductivity (kcal/m·hr·°C.) |
| 59 | Product of Run No. 47 | 0.46 | 12 | 0.11 | 14 | 0.12 |
| 60 | Novolak resin | 0.51 | 9 | 0.16 | 4 | 0.17 |
| 61 | 6-Nylon | 0.63 | 17 | 0.24 | Measurement impossible | Measurement impossible |
| 62 | Aluminum powder | 0.59 | 4 | 0.26 | possible Measurement impossible | possible 0.29 |

The heat-treated product in Run No. 61 was brittle and deformed, and its compression strength and thermal conductivity could not be measured as indicated in Table 8.

EXAMPLE 4

Ten parts by weight, as solids content, of each of the resol solution obtained in Run No. 21, the novolak resin (containing 15% by weight of hexamethylene tetramine) obtained in Run No. 22, and the product of Run No. 46 was mixed with the blend shown in Table A. The resulting mixture was filled uniformly in a mold, and compression-molded at 155° C. and 400 kg/cm$^2$ for 30 minutes. After removing the mold frame, the molded article was maintained at 170° C. for 24 hours to complete its curing. Thus, an abrasive stone having an outside diameter of 510 mm, a thickness of 205 mm and a hole diameter of 305 mm was produced.

TABLE A

| Blend | Blending proportions (parts by weight) |
|---|---|
| Alumina sintered abrasive grains SM #16 (made by Showa Denko K.K.) | 40 |
| Alumina sintered abrasive grains SM #20 (made by Showa Denko K.K.) | 40 |
| Alumina sintered abrasive grains SM #24 (made by Showa Denko K.K.) | 20 |
| Furfural | 1.5 |
| p-Cresol | 0.5 |
| Cryolite powder | 9 |
| Pyrite #60 (made by Dowa Teppun) | 10 |

Table 9 summarizes the types of the phenol resins used, and the properties of the abrasive stone when it was tested at a peripheral speed of 4,800 m/min. under a pressing force of 500 kg.

TABLE 9

| Run No. | Type of the phenol resin used | Properties of the abrasive stone | | |
|---|---|---|---|---|
| | | Amount of stainless steel SCS ground per 12 hours (kg/hr) | Cracking by the heat of grinding | Rotation break strength (m/min.) |
| 63 | The uncured resol resin obtained in Run No. 21 | 83 | Much | 6,900 |
| 64 | The novolak resin (uncured; containing hexamine) obtained in Run No. 22 | 74 | Much | 7,200 |
| 65 | Product of Run No. 46 | 102 | None | 8,700 |

EXAMPLE 5

Commercially available special-grade Cr, Al$_2$O$_3$ and Al(OH)$_3$ which had been passed through a 300 mesh sieve were dry-mixed in amounts of 30, 50 and 20 parts by weight respectively. An equal amount of methyl alcohol was added to the mixture, and pulverized in the wet state by a vibratory mill. During the wet mixing. 0.25 part by weight of wax (Run No. 66), or 0.25 part by weight of the product of Run No. 36 which had been passed through a 300 mesh sieve (Run No. 67) was added to 100 parts by weight of the dry mixture. The resulting mixture was dried under reduced pressure, and then heat-treated at 100° C. for 24 hours. The mixture was molded under a pressure of 3 tons/cm² to prepare test samples having a size of 5 mm×3 mm×50 mm. While hydrogen passed through hot water at 80° C. was fed to each of the resulting test samples, the temperature was raised to 1650° C. from room temperature over the course of 24 hours. The samples were maintained at this temperature for 6 hours, and then gradually cooled to form calcined test samples.

Table 10 summarizes the types of the additives used in the production of the two types of molded articles, and the apparent densities, flexural strengths and specific electric resistances at 700° C. and 1000° C. of the calcined test samples.

TABLE 10

| | | Calcined test sample | | | |
|---|---|---|---|---|---|
| | Additive used | Apparent | Flexural | Specific resistance (ohm-cm) | |
| Run No. | in the molded article | density (g/cc) | strength (kg/cm²) | 700° C. | 1000° C. |
| 66 | Wax | 4.2 | 2,600 | 10⁸ | 10⁵ |
| 67 | Product of Run No. 36 | 4.4 | 3,400 | 10⁶ | 10³ |

In Table 10, the specific electric resistances at 700° C. and 1000° C. were tested in accordance with an ordinary method of measuring specific electric resistance except as noted below. Lead wires (platinum wires) were secured to both ends of a test sample, and the test sample was placed stationary in the central part of an alumina-silica furnace tube in an atmosphere of nitrogen, and then its specific electric resistance was measured while maintaining the temperature of the furnace at 700° C. or 1000° C.

EXAMPLE 6

A composition was prepared from 134 parts by weight of the same clay as used in Example 1 and 100 parts by weight of a silica powder which had been passed through a 100 mesh sieve. Molded articles were produced in the same way as in Example 1 from this composition and a composition composed of this mixture and 15 parts by weight of the product of Run No. 45. Each of the molded articles was air-dried for 2 days, and dried at 50° C. for 24 hours. Each of the test samples obtained was put in a furnace, and while feeding a gaseous mixture composed of 20% by volume of hydrogen chloride and 80% by volume of nitrogen, the temperature of the furnace was raised from room temperature to 1600° C. over the course of 6 hours. The test sample was then maintained at this temperature for 6 hours, and cooled by feeding nitrogen gas alone instead of the above gaseous mixture to give calcined test samples.

Table 11 summarizes the colors, hardnesses and compression strengths of the calcined test samples.

TABLE 11

| | Amount of the product of Run No. 45 | Calcined test sample | | |
|---|---|---|---|---|
| Run No. | (parts by weight) | Color | Hardness (kg/mm²) | Compression strength (kg/cm²) |
| 68 | 0 | Pale yellow | 340 | 120 |
| 69 | 15 | Gray | 820 | 870 |

REFERENTIAL EXAMPLE 5

(1) A 2-liter separable flask was charged with 1.5 kg of a mixed aqueous solution at 25° C. of hydrochloric acid and formaldehyde in the various concentrations shown in Table 12, and while the mixed aqueous solution was stirred, 125 g of a mixed aqueous solution at 25° C. containing 20% by weight of phenol, 20% by weight of urea and 14.6% by weight of formaldehyde prepared from 98% phenol (the remaining 2% by weight being water), urea, 37% by weight formalin and water was added. The mixture was then stirred for 15 seconds, and thereafter left to stand for 60 minutes. During the 60-minute standing, the contents of the separable flask remained clear (Runs Nos. 101 and 120 in Table 12), or turned from a clear solution to a whitely turbid suspension and remained whitely turbid (Runs Nos. 103, 109 and 118 in Table 12), or turned from a clear solution to a whitely turbid suspension and gave a white precipitate (Runs Nos. 102, 104–108, 110–117, and 119 in Table 12). By microscopic observation, this white precipitate was found to contain spherical particles, an agglomerated mass of spherical particles, and a small amount of a powder. Then, with occasional stirring, the contents of the separable flask were heated to 80° C. over 60 minutes and then maintained at 80° to 82° C. for 15 minutes to obtain a reaction product. The reaction product was washed with warm water at 40° to 45° C., treated at 60° C. for 30 minutes in a mixed aqueous solution containing 0.5% by weight of ammonia and 50% by weight of methanol, again washed with warm water at 40° to 45° C., and then dried at 80° C. for 2 hours. The properties of the reaction products are shown in Table 13.

(2) Table 12 summarizes the concentrations of hydrochloric acid and formaldehyde used, the total concentration of hydrochloric acid and formaldehyde, the proportion of the weight of the HCl-formaldehyde solution based on the total weight of the phenol and urea, and the mole ratio of formaldehyde to phenol-+urea. Table 13 summarizes the contents of particles having a size of 0.1 to 50 microns and 0.1 to 100 microns respectively obtained by microscopic observation, the amount of particles which passed through a 150 Tyler mesh sieve, and the $D_{960-1020}/D_{1450-1500}$, $D_{1280-1360}/D_{1450-1500}$ and $D_{1580-1650}/D_{1450-1500}$ ratios of the resulting products.

TABLE 12

| | Concentrations of the HCl—formaldehyde (wt. %) | | | Proportion of the weight of the HCl—HCHO bath based on the total amount of phenol and urea (wt. %) | | Mole ratio of total HCHO to the mixture of |
|---|---|---|---|---|---|---|
| Run No. | HCl | HCHO | Total | HCl | HCHO | phenol and urea |
| 101 | 3 | 1 | 4 | 90 | 30 | 1.6 |
| 102 | 3 | 28 | 31 | 90 | 840 | 21.2 |

TABLE 12-continued

| Run No. | Concentrations of the HCl—formaldehyde (wt. %) | | | Proportion of the weight of the HCl—HCHO bath based on the total amount of phenol and urea (wt. %) | | Mole ratio of total HCHO to the mixture of phenol and urea |
|---|---|---|---|---|---|---|
| | HCl | HCHO | Total | HCl | HCHO | |
| 103 | 5 | 2 | 7 | 150 | 60 | 2.3 |
| 104 | 5 | 10 | 15 | 150 | 310 | 8.1 |
| 105 | 5 | 22 | 27 | 150 | 660 | 16.8 |
| 106 | 7 | 30 | 37 | 210 | 900 | 22.6 |
| 107 | 10 | 7 | 17 | 300 | 210 | 5.9 |
| 108 | 10 | 18 | 28 | 300 | 540 | 13.9 |
| 109 | 12 | 3 | 15 | 360 | 90 | 3.0 |
| 110 | 15 | 5 | 20 | 450 | 150 | 4.5 |
| 111 | 15 | 22 | 37 | 450 | 660 | 16.8 |
| 112 | 18 | 10 | 28 | 540 | 300 | 8.1 |
| 113 | 20 | 7 | 27 | 600 | 210 | 5.9 |
| 114 | 22 | 4 | 26 | 660 | 120 | 3.8 |
| 115 | 22 | 17 | 39 | 660 | 510 | 13.2 |
| 116 | 25 | 6 | 31 | 750 | 180 | 5.2 |
| 117 | 25 | 25 | 50 | 750 | 750 | 19.0 |
| 118 | 28 | 3 | 31 | 780 | 790 | 2.6 |
| 119 | 28 | 7 | 35 | 780 | 210 | 5.9 |
| 120 | 33 | 1 | 35 | 990 | 30 | 1.6 |
| 21 | Heat-cured product of resol | | | | | |
| 22 | Hexamine heat-cured product of novolak | | | | | |
| 23 | Cured novolak fibers | | | | | |

TABLE 13

| Run No. | Content of particles with a size of 0.1–50 microns (%) | Content of particles with a size of 0.1–100 microns (%) | Proportion of particles which passed through a 150 Tyler mesh sieve (wt. %) | IR intensity ratio | | |
|---|---|---|---|---|---|---|
| | | | | $D_{1580-1650}/D_{1450-1500}$ | $D_{1280-1360}/D_{1450-1500}$ | $D_{960-1020}/D_{1450-1500}$ |
| 101 | 13 (86) | 13 (100) | 13 (87) | 0.31 | 0.29 | 0.10 |
| 102 | 6 (45) | 6 (58) | 6 (52) | 0.46 | 0.53 | 0.53 |
| 103 | 32 (91) | 32 (98) | 32 (93) | 0.73 | 0.46 | 0.14 |
| 104 | 56 | 78 | 65 | 1.67 | 0.73 | 0.45 |
| 105 | 38 | 47 | 58 | 1.41 | 0.86 | 0.47 |
| 106 | 7 (18) | 7 (39) | 7 (66) | 1.36 | 0.75 | 0.48 |
| 107 | 99 | 99 | 93 | 1.34 | 0.88 | 0.31 |
| 108 | 90 | 99 | 88 | 1.26 | 0.97 | 0.38 |
| 109 | 78 | 85 | 72 | 1.18 | 0.65 | 0.29 |
| 110 | 92 | 100 | 87 | 1.29 | 0.96 | 0.23 |
| 111 | 43 | 87 | 68 | 1.16 | 0.85 | 0.37 |
| 112 | 100 | 100 | 100 | 1.37 | 1.10 | 0.29 |
| 113 | 100 | 100 | 100 | 1.26 | 1.08 | 0.26 |
| 114 | 72 | 77 | 66 | 1.38 | 0.54 | 0.19 |
| 115 | 50 | 76 | 76 | 1.54 | 0.97 | 0.56 |
| 116 | 84 | 96 | 81 | 1.49 | 0.66 | 0.31 |
| 117 | 10 (63) | 10 (68) | 10 (73) | 1.01 | 0.78 | 0.64 |
| 118 | 38 | 69 | 65 | 1.34 | 0.47 | 0.19 |
| 119 | 46 | 75 | 69 | 1.14 | 0.77 | 0.32 |
| 120 | 7 (18) | 7 (49) | 7 (64) | 0.75 | 0.39 | 0.12 |
| 21 | 17 | — | — | 0.22 | 0.10 | 0.03 |
| 22 | 58 | — | — | 0.50 | 0.13 | 3.73 |
| 23 | 39 | — | — | 0.51 | 0.08 | 0.14 |

In Runs Nos. 101, 102, 106, 117 and 120 in Table 12, a large amount of a sticky resin, a hard large lumpy or plate-like mass formed at the bottom of the separable flasks.

In Runs Nos. 101, 102 and 120, only less than 49 g of a solid was obtained from 25 g of phenol and 25 g of urea used.

The contents of particles having a size of 0.1–50 microns and 0.1–100 microns and the proportion of particles which passed the 150 Tyler mesh sieve given in Table 13 for Runs Nos. 101, 102, 103, 106, 117 and 120 are based on the entire solid including the sticky resin, lumpy mass and plate-like mass. The contents of these and the proportion of the particles which passed through the 150 Tyler mesh sieve, based on the granular or powdery product alone in the resulting solid, are given in the parentheses in Table 13.

FIG. 2 shows an infrared absorption spectral chart of the granular or powdery product obtained in Run No. 112, and also illustrates how to determine $t_p$ and $t_b$, which are required in obtaining the absorption intensity D, from the infrared absorption spectral chart. A base line is drawn across a certain peak, and $t_p$ and $t_b$ can be determined at the wavelength of the peak as illustrated.

REFERENTIAL EXAMPLE 6

Ten kilograms of a mixed aqueous solution containing 18% by weight of hydrochloric acid and 11% by weight of formaldehyde was put in each of six 20-liter reaction vessels in a room kept at a temperature of 21° to 22° C. While the mixed aqueous solution was stirred at 23° C., a mixed aqueous solution containing 30% by weight of phenol, 20% by weight of urea and 11% by weight of formaldehyde was added in an amount of 3.34 kg, 2.66 kg, 1.60 kg, 1.06 kg, 0.74 kg, and 0.45 kg, respectively. The bath ratio at this time was 7.0, 8.5, 13.5, 20.0, 28.0, and 45.0, respectively. In all runs, when the stirring was continued after the addition of the mixed aqueous solution containing phenol, the mixture abruptly became whitely turbid in 10 to 60 seconds. The stirring was stopped as soon as the mixture became whitely turbid. The mixture was then left to stand for 3 hours. The temperature of the mixture gradually rose, and in 30 minutes after it became whitely turbid, the formation of a white slurry-like or resin-like product was observed. With stirring, the reaction mixture was washed with water. With the reaction mixture obtained at a bath ratio of 7.0, a large amount of a resinous hardened product melt-adhered to the stirring rod, and the stirring became very difficult.

The contents of the reaction vessel were treated in a 0.3% by weight aqueous solution of ammonia at 30° C. for 2 hours with slow stirring, washed with water, and dehydrated. The resulting granular or powdery product or mass was lightly crumpled by hand, and dried at 40° C. for 3 hours. After drying, the products had a water content of less than 0.5% by weight. The contents of the vessels are designated as Runs Nos. 131, 132, 133, 134, 135 and 136 in the increasing order of the bath ratio.

Table 14 summarizes the maximum temperature reached of the reaction system during the time from the initiation of the reaction to 3 hours after the reaction system became whitely turbid, the yield of the reaction product, the presence or absence of spherical primary particles by microscopic observation, the proportion of particles which passed through a 150 Tyler mesh sieve, the bulk density of the particles which passed through the 150 Tyler mesh sieve, the heat fusibility of the reaction product at 100° C., the methanol solubility of the product, and the free phenol content of the product.

In Run No. 131 shown in Table 14, a sticky resin and a lumpy mass formed in an amount of about 80% based on the entire solid formed at the bottom of the flask, and the proportion of the resulting granular or powdery product was only about 20% based on the entire solid. About 85% of such granular or powdery product passed through a 100 Tyler mesh sieve. The "little" in the column of the presence or absence of spherical primary particles indicated in Table 14 for Run No. 131 was because the proportion of the granular or powdery product based on the entire solid product was as small as about 20%. Hence, the method of Run No. 131 cannot be recommended as a manufacturing method, but the resulting granular or powdery product sufficiently has the properties of the granular or powdery product suitably used in this invention.

Almost 100% of each of the granular or powdery products obtained in Runs Nos. 131 to 136 consisted of particles having a particle size of 0.1 to 100 microns.

REFERENTIAL EXAMPLE 7

A 2-liter separable flask was charged with 1,250 g of a mixed aqueous solution at 24° C. containing 20% by weight of hydrochloric acid and 8% by weight of formaldehyde, and while it was stirred, a solution of each of the phenols shown in Table 15 and each of the nitrogen compounds shown in Table 15 diluted to a concentration of 20 to 80% by weight with 37% by weight formalin was added so that the total amount of the phenol and the nitrogen-containing compound became 50 g. As soon as the solution containing the phenol and the nitrogen-containing compound were added, the mixture became turbid, and in some Runs, instantaneously turned white, pink or brown. In 10 seconds after the addition of the solution, the stirring was stopped. After stopping of the reaction, the mixture was allowed to stand for 60 minutes. Again with stirring, it was heated to 75° C. over 30 minutes, and maintained at 73° to 76° C. for 60 minutes. The reaction product was washed

TABLE 14

| Run No. | Bath ratio | Maximum temperature of the reaction system reached (°C.) | Yield (wt. %) | Proportion of particles which passed through a 150 Tyler mesh sieve (wt. %) | Bulk density of the 150 Tyler mesh under particles (g/cc) | Presence or absence of spherical primary particles | Heat fusibility at 100° C. | Methanol solubility (wt. %) | Free phenol content (ppm) |
|---|---|---|---|---|---|---|---|---|---|
| 131 | 7.0 | 39.5 | 100 | 11 | 0.19 | Little | Melt-adhered | 83.8 | 150 |
| 132 | 8.5 | 39.0 | 113 | 56 | 0.16 | Much | Melt-adhered | 67.7 | 50 |
| 133 | 13.5 | 38.0 | 124 | 88 | 0.14 | Mostly | Melt-adhered | 60.4 | 35 |
| 134 | 20.0 | 36.5 | 128 | 100 | 0.12 | " | Melt-adhered | 53.6 | 30 |
| 135 | 28.0 | 36.0 | 128 | 100 | 0.11 | " | Melt-adhered | 54.4 | 25 |
| 136 | 45.0 | 36.0 | 129 | 99 | 0.11 | " | Melt-adhered | 52.6 | 25 |
| 21 | (Comparison; see Table 1) | — | — | — | 0.62 | None | Infusible | Not more than 1 | Below 5 |
| 22 | (Comparison; see Table 1) | — | — | — | 0.46 | " | Melt-adhered | 1.6 | Below 5 |
| 23 | (Comparison; see Table 1) | — | — | — | 0.24 | " | Infusible | Not more than 1 | Below 5 |

In Table 14, the free phenol contents in Runs Nos. 21, 22 and 23 are values measured with regard to resol and novolak resins before heat-curing and are indicated in the parentheses.

with water, treated at 45° C. for 60 minutes in a mixed aqueous solution containing 0.3% by weight of ammonia and 60% by weight of methanol, washed with water, and finally dried at 80° C. for 3 hours.

Table 15 summarizes the types and proportions of the phenol and the nitrogen-containing compound used, the concentrations of the phenol and the nitrogen-containing compound in the formalin-diluted solution, the color of the reaction product observed 60 minutes after the addition of the resulting diluted solution, the yield of the reaction product based on the total amount of the phenol and the nitrogen-containing compound, the content of particles having a size of 0.1 to 50 microns in the reaction product, the proportion of particles which passed through a 150 Tyler mesh sieve, the $D_{960-1020}$ $D_{1450-1500}$ ratio, and the heat resistance of the product.

of formaldehyde was added at a time. Ten seconds after the addition of the diluted solution, the stirring was stopped, and the solution was left to stand. In all Runs, the solution abruptly became whitely turbid in 18 to 19 seconds after the stopping of the stirring, and the formation of milk-white product was observed. The temperature of the solution gradually rose from 18° C., and reached a peak at 31°-32° C. in 5 to 7 minutes after the addition of the diluted solution of phenol, and then decreased. The flask was left to stand at room temperature for 0.5 hour (Run No. 161), 1 hour (Run No. 162), 3 hours (Run No. 163), 6 hours (Run No. 164), 24 hours

TABLE 15

| Run No. | Proportion of the materials used (wt.) Phenol | Nitrogen-containing compound | Concentration of the material in the diluted solution (wt. %) | Color of the reaction product (60 minutes after addition) | Yield (wt. %) | Contents of the particles having a size of 0.1 to 50 microns (%) |
|---|---|---|---|---|---|---|
| 137 | Phenol 100 | Urea | 0 | 80 | Pink | 118 | 91 |
| 138 | Phenol 97 | " | 3 | " | " | 108 | 90 |
| 139 | Phenol 94 | " | 6 | " | " | 112 | 97 |
| 140 | Phenol 75 | " | 25 | 50 | Pale pink | 128 | 100 |
| 141 | Phenol 55 | " | 45 | 40 | White color | 132 | 100 |
| 142 | Phenol 35 | " | 64 | 30 | " | 115 | 100 |
| 143 | Phenol 25 | " | 75 | 20 | " | 76 | 100 |
| 144 | Phenol 10 | " | 90 | 20 | " | 31 | 100 |
| 145 | Phenol 50 | N,N'—dimethyl-olurea | 50 | " | " | 105 | 94 |
| 146 | Phenol 75 | Aniline | 25 | 80 | Reddish brown | 101 | 82 |
| 147 | Phenol 50 | Melamine | 50 | " | White | 86 | 100 |
| 148 | Phenol 50 | Urea | 50 | 40 | " | 109 | 100 |
| 149 | Phenol 50 | " | 50 | " | Red | 100 | 72 |
| 150 | Phenol/resorcinol (= 34/33) | Urea | 33 | 40 | Red | 132 | 91 |
| 151 | Phenol/t-butylphenol (= 40/20) | " | 40 | " | Brown | 84 | 96 |
| 152 | Phenol 50 | Urea/melamine | (= 25/25) | 50 | White | 102 | 95 |
| 21 | Heat-cured resol resin | | | | | | 17 |
| 22 | Hexamine heat-cured novolak resin | | | | | | 58 |
| 23 | Cured novolak fibers | | | | | | 39 |

| Run No. | Proportion of particles which passed through a 150 Tyler mesh sieve (wt. %) | IR intensity ratio $D_{1580-1650}/D_{1450-1500}$ | $D_{1280-1350}/D_{1450-1500}$ | $D_{960-1020}/D_{1450-1500}$ | Heat resistance test (°C.) |
|---|---|---|---|---|---|
| 137 | 98 | 0.25 | 0.18 | 0.44 | 750 |
| 138 | 98 | 0.27 | 0.18 | 0.31 | 420 |
| 139 | 100 | 0.57 | 0.21 | 0.30 | 280 |
| 140 | 100 | 1.24 | 0.95 | 0.19 | 200 |
| 141 | 100 | 1.32 | 1.10 | 0.29 | " |
| 142 | 100 | 1.37 | 1.08 | 0.29 | " |
| 143 | 100 | 1.37 | 0.99 | 0.30 | " |
| 144 | 100 | 1.24 | 0.96 | 0.27 | " |
| 145 | 100 | 1.19 | 0.88 | 0.38 | " |
| 146 | 88 | 1.21 | 1.03 | 0.20 | " |
| 147 | 96 | 1.15 | 0.75 | 0.28 | " |
| 148 | 100 | 1.31 | 1.02 | 0.27 | " |
| 149 | 83 | 1.33 | 0.99 | 0.26 | " |
| 150 | 94 | 1.25 | 0.99 | 0.25 | " |
| 151 | 96 | 1.16 | 0.96 | 0.19 | " |
| 152 | 100 | 1.24 | 1.01 | 0.30 | " |
| 21 | | 0.22 | 0.10 | 0.03 | 720 |
| 22 | | 0.50 | 0.13 | 3.73 | 610 |
| 23 | | 0.15 | 0.08 | 0.14 | 740 |

REFERENTIAL EXAMPLE 8

Each of six 1-liter separable flasks was charged with 1,000 g of a mixed aqueous solution at 18° C. containing 18% by weight of hydrochloric acid and 9% by weight of formaldehyde. The room temperature was 15° C. While the solution was stirred, 15 g of urea was dissolved in it, and then 25 g of a mixed diluted solution containing 80% by weight of phenol and 5% by weight (Run No. 165), and 72 hours (Run No. 166), respectively, after the addition of the diluted phenol solution. Then, the contents of the flask were treated in a 0.75% by weight aqueous solution of ammonia at 15° to 17° C. for 3 hours, washed with water, dehydrated, and finally dried at 40° C. for 6 hours.

Table 16 summarizes the proportion of particles which passed through a 150 Tyler mesh sieve, the $D_{960-}$ 1020/D1450-1500 ratio, the methanol solubility, and the free phenol content of the resulting dried products. The samples obtained in Runs Nos. 161 to 166 all melt-adhered in a fusibility test conducted at 100° C. for 5 minutes.

TABLE 16

| Run No. | Standing time at room temperature (hours) | Proportion of particles which passed through a 150 Tyler mesh sieve (wt. %) | Methanol solubility (wt. %) | IR intensity ratio ($D_{960-1020}/D_{1450-1500}$) | Free phenol content (ppm) |
| --- | --- | --- | --- | --- | --- |
| 161 | 0.5 | 63 | 99.5 | 0.13 | 280 |
| 162 | 1 | 87 | 97.8 | 0.17 | 70 |
| 163 | 3 | 95 | 85.7 | 0.24 | 45 |
| 164 | 6 | 100 | 63.4 | 0.29 | 30 |
| 165 | 24 | 100 | 40.2 | 0.29 | 20 |
| 166 | 72 | 98 | 35.6 | 0.31 | 15 |

REFERENTIAL EXAMPLE 9

A 1000-liter reaction vessel equipped with a stirring rod was charged with 800 kg of a mixed aqueous solution at 22.5° C. containing 18.5% by weight of hydrochloric acid and 8.5% by weight of formaldehyde, and while the mixed aqueous solution was stirred, 40 kg of a mixed aqueous solution at 20° C. containing 20% by weight of phenol, 10% by weight of hydroquinone and 20% by weight of urea was added.

After adding all of the phenol solution, the mixture was stirred for 20 seconds. The stirring was stopped, and the mixture was left to stand for 2 hours. In the reaction vessel, white suspended particles abruptly formed in 35 seconds after the addition of all of the phenol solution. A white granular product gradually formed, and the temperature of the suspension gradually rose to 35.5° C. and then decreased. The mixed aqueous solution in which the reaction product formed was again stirred, and a valve secured to the bottom of the reaction vessel was opened to withdraw the contents. By using a nonwoven fabric of Nomex (a tradename for a product of E. I. du Pont de Nemours & Co.), the contents were separated into the reaction product and the mixed aqueous solution of hydrochloric acid and formaldehyde. The resulting reaction product was washed with water, dehydrated, dipped for a day and night in a 0.5% by weight aqueous solution of ammonia at 18° C., again washed with water, and dehydrated to give 29.9 kg of the reaction product having a water content of 15% by weight.

2.0 kg of the reaction product thus obtained was dried at 40° C. for 3 hours to give 1.7 kg of a sample (Run No. 167).

Table 17 gives the contents of particles having a size of 0.1 to 50 microns and particles having a size of 0.1 to 100 microns determined by microscopic observation of the resulting dried sample, the proportion of particles which passed through a 150 Tyler mesh sieve, and the methanol solubility of the product.

TABLE 17

| Run No. | Content of 0.1-50 micron particles (%) | Content of 0.1-100 micron particles (%) | Proportion of particles 150 mesh under (wt. %) | Methanol solubility (wt. %) |
| --- | --- | --- | --- | --- |
| 167 | 100 | 100 | 99 | 58 |

EXAMPLE 7

Commercially available clay ("Jinseido" containing 34% by weight of water) alone (Run No. 170) or a mixture of 134 parts by weight of this clay and 0.3 part by weight (Run No. 171), 1 part by weight (Run No. 172), 3 parts by weight (Run No. 173), 6 parts by weight (Run No. 174), 10 parts by weight (Run No. 175), or 20 parts by weight (Run No. 176) of the granular or powdery resin obtained in Run No. 112 was fully kneaded by hand. The clay alone or the kneaded mixture was molded into five molded articles using a wooden mold having a width of 15 mm, a thickness of 10 mm and a length of 100 mm. These molded articles were dried at room temperature for 2 days, ground to a shape having a width of 13 mm, a thickness of 6 mm and a length of 80 mm, and then dried in a dryer at 50° C. for 8 hours to prepare precursor articles for calcination. The precursor articles were placed stationary at the central portion of an alumina-silica furnace tube, and while passing nitrogen gas through the furnace at a flow rate of 5 ml/cm² of the cross sectional area of the furnace per minute, the temperature was elevated to 1600° C. over the course of 8 hours. The precursor articles were then maintained at this temperature for 3 hours, and thereafter cooled gradually. The calcined test samples were taken out.

Table 18 summarizes the amount of the product of Run No. 112 used, and the appearance, length retention (based on the precursor article) and flexural strength of each of the calcined test samples.

TABLE 18

| Run No. | Amount of the product of Run No. 112 (parts by weight) | Calcined test sample | | |
| --- | --- | --- | --- | --- |
| | | Appearance | Length retention (%) | Flexural strength (kg/cm²) |
| 170 | 0 | Large gas blisters | 91.0 | 510 |
| 171 | 0.3 | Good | 91.4 | 670 |
| 172 | 1 | Good | 91.9 | 810 |
| 173 | 3 | Good | 90.9 | 860 |
| 174 | 6 | Good | 89.0 | 730 |
| 175 | 10 | Good | 88.3 | 540 |
| 176 | 20 | Good | 85.7 | 110 |

EXAMPLE 8

A composition consisting of 7 parts by weight of water and 100 parts by weight of a mixture composed of 750 parts by weight of electrically fused alumina, 15 parts by weight of silicon carbide, 2 parts by weight of natural graphite and 8 parts by weight of metallic silicon (Run No. 177), and a composition consisting of 100 parts by weight of the same mixture as above, 7 parts by weight of water, and 5 parts by weight of the reaction product of Run No. 147 (previously passed through a 200 mesh sieve) (Run No. 178) were prepared. Each of these compositions was molded in a mold under a pressure of 5 tons/cm² to prepare 15 test samples each having a width of 5 mm, a thickness of 5 to 6 mm and a length of 50 mm. These test samples were then calcined at a temperature of 800° C. for 5 hours in a coke furnace filled with coke powder.

Table 19 summarizes the compression strength and the rate of crack occurrence of the two types of test samples obtained by the above method. The compression strength and the rate of crack occurrence were determined in the same way as described in Example 2.

TABLE 19

| Run No. | Amount of the product of Run No. 112 (parts by weight) | Calcined article | |
|---|---|---|---|
| | | Compression strength (kg/cm²) | Number of samples which developed cracks (per 10 samples) |
| 177 | 0 | 230 | 5 |
| 178 | 5 | 260 | 1 |

EXAMPLE 9

Seven parts by weight of the product of Run No. 167 (Run No. 179), a blend (Run No. 180) obtained by adding 15% by weight of hexamethylenetetramine to the uncured novolak resin obtained in Run No. 22, 6-nylon powder (Run No. 181), or metallic aluminum powder (Run No. 182) as a binder material was added to 100 parts by weight of diatomaceous earth. The resulting mixture was molded by a hot press at a temperature of 250° C. and a pressure of 200 to 500 kg/cm² to prepare five molded plates having a width of 100 mm, a length of 100 mm and a thickness of 8 to 10 mm.

Table 20 summarizes the bulk density, compression strength and thermal conductivity of each of the molded plates and the type of the binder used. Table 20 also shows the compression strengths and thermal conductivities of the molded plates which had been further heat-treated at 650° C. for 5 minutes in an atmosphere of nitrogen gas.

TABLE 20

| | | Molded plate | | | Molded plate after heat-treatment | |
|---|---|---|---|---|---|---|
| Run No. | Type of the binder used | Bulk density (g/cc) | Compression strength (kg/cm²) | Thermal conductivity (kcal/m · hr · °C.) | Compression strength (kg/cm²) | Thermal conductivity (kcal/m · hr · °C.) |
| 179 | Product of Run No. 167 | 0.43 | 14 | 0.10 | 16 | 0.13 |
| 180 | Novolak resin | 0.51 | 9 | 0.16 | 4 | 0.17 |
| 181 | 6-Nylon | 0.63 | 17 | 0.24 | Measurement impossible | Measurement impossible |
| 182 | Aluminum powder | 0.59 | 4 | 0.26 | 11 | 0.29 |

The heat-treated product of Run No. 181 was brittle and deformed, and its compression strength and thermal conductivity could not be measured as indicated in Table 20.

EXAMPLE 10

Ten parts by weight, calculated as resin solids, of each of the resol solution obtained in Run No. 21 (Run No. 183), the novolak resin (containing 15% by weight of hexamethylenetetramine) obtained in Run No. 22 (Run No. 184), and the product of Run No. 164 (Run No. 185) was added to the blend shown in Table A in Example 4. The resulting mixture was filled uniformly in a mold and then compression-molded at a temperature of 155° C. and a pressure of 400 kg/cm² for 30 minutes. After removing the mold frame, the molded article was maintained at 170° C. for 24 hours to complete its curing. Thus, an abrasive stone having an outside diameter of 510 mm, a thickness of 204 mm and a hole diameter of 304 mm was produced.

Table 21 summarizes the type of the phenol resin used, and the properties of the abrasive stone in a test conducted at a peripheral speed of 4,800 m/min. under a pressing force of 500 kg.

TABLE 21

| | | Properties of the abrasive stone | | |
|---|---|---|---|---|
| Run No. | Type of the phenol resin used | Amount of stainless steel SCS ground per 12 hours (kg/hr) | Cracking by the heat of grinding | Rotating break strength (m/min.) |
| 183 | Uncured resol resin obtained in Run No. 21 | 83 | Much | 6,900 |
| 184 | Novolak resin (uncured; containing hexamine) obtained in Run No. 22 | 74 | Much | 7,200 |
| 185 | Product of Run No. 146 | 97 | None | 9,400 |

EXAMPLE 11

Commercially available special-grade Cr, Al₂O₃ and Al(OH)₃ which had been passed through a 300 mesh sieve were dry-mixed in amounts of 30, 50 and 20 parts by weight respectively. An equal amount of methyl alcohol was added to the mixture, and pulverized in the wet state by a vibratory mill. During the wet mixing, 0.25 part by weight of wax (Run No. 186), or 0.25 part by weight of the product of Run No. 140 which had been passed through a 300 mesh sieve (Run No. 187) was added to 100 parts by weight of the dry mixture. The resulting mixture was dried under reduced pressure, and then heat-treated at 100° C. for 24 hours. Then, the mixture was molded under a pressure of 3 tons/cm² to prepare test samples having a size of 5 mm×3 mm×50 mm. While hydrogen passed through hot water at 80° C. was fed to each of the resulting test samples, the temperature was raised to 1650° C. from room temperature over the course of 24 hours. The samples were then maintained at this temperature for 6 hours, and then gradually cooled to form calcined test samples.

Table 22 summarizes the types of the additives used in the production of the two types of the molded articles, and the apparent densities, flexural strengths and specific electric resistances at 700° C. and 1000° C. of the calcined test samples.

TABLE 22

| | | Calcined test sample | | | |
|---|---|---|---|---|---|
| Run No. | Additive used in the molded article | Apparent density (g/cc) | Flexural strength (kg/cm²) | Specific resistance (ohm-cm) 700° C. | 1000° C. |
| 186 | wax | 4.2 | 2,600 | $10^8$ | $10^6$ |
| 189 | Product of Run No. 140 | 4.4 | 3,100 | $10^6$ | $10^4$ |

In Table 22, the specific electric resistances at 700° C. and 1000° C. were tested in accordance with an ordinary method of measuring specific electric resistance except as noted below. Lead wires (platinum wires) were secured to both ends of a test sample, and the test sample was placed stationary in the central part of an alumina-silica furnace in an atmosphere of nitrogen, and then its specific electric resistance was measured while maintaining the temperature of the furnace at 700° C. or 1000° C.

EXAMPLE 12

A mixture was prepared from 134 parts by weight of the same clay as used in Example 7 and 100 parts by weight of a silica powder which had been passed through a 100 mesh sieve. Molded articles were produced in the same way as in Example 1 from this mixture (Run No. 188) and a mixture (Run No. 189) composed of this mixture and 15 parts by weight of the product of Run No. 135. Each of the molded articles was airdried for 2 days, and dried at 50° C. for 24 hours. Each of the test samples obtained was put in a furnace, and while feeding a gaseous mixture composed of 20% by volume of hydrogen chloride and 80% by volume of nitrogen, the temperature of the furnace was raised from room temperature to 1600° C. over the course of 6 hours. The test sample was then maintained at this temperature for 6 hours, and cooled by feeding nitrogen gas alone instead of the above gaseous mixture to give calcined test samples.

Table 23 summarizes the colors, hardnesses and compression strengths of the calcined test samples.

TABLE 23

| | Amount of the product of Run No. 135 (parts by weight) | Calcined test sample | | |
|---|---|---|---|---|
| Run No. | | Color | Hardness (kg/mm²) | Compression strength (kg/cm²) |
| 188 | 0 | Pale yellow | 340 | 120 |
| 189 | 15 | Gray | 690 | 680 |

What is claimed is:

1. A composition having a high content of an inorganic material comprising
  (1) a granular or powdery phenol-aldehyde resin which is a condensation product of a phenol, an aldehyde and optionally a nitrogen-containing compound having at least two active hydrogens and is characterized by (A) containing spherical primary particles and their secondary agglomerated particles each having a particle diameter of 0.1 to 150 microns, (B) having such a size that at least 50% by weight thereof can pass through a 100 Tyler mesh sieve, and (C) having a free phenol content, determined by liquid chromatography, of not more than 500 ppm, and
  (2) a powder of an inorganic material,
the amount of the phenol-aldehyde resin being less than 11% by weight based on the total weight of the phenol-aldehyde resin (1) and the powdery inorganic material (2).

2. The composition of claim 1 wherein the granular or powdery resin is a condensation product of a phenol and an aldehyde, and has a $D_{990-1015}/D_{1600}$ ratio of from 0.2 to 9.0 and a $D_{890}/D_{1600}$ ratio of from 0.09 to 1.0 in its infrared absorption spectrum measured by a KBr tablet method, in which $D_{1600}$ represents the absorption intensity of an absorption peak at 1600 cm$^{-1}$, $D_{990-1015}$ represents the highest absorption intensity of absorption peaks in the range of 990 to 1015 cm$^{-1}$, and $D_{890}$ represents the absorption intensity of an absorption peak at 890 cm$^{-1}$.

3. The composition of claim 2 wherein at least 30% of the granular or powdery resin consists of spherical primary particles and their secondary agglomerated particles each having a particle diameter of 0.1 to 150 microns.

4. The composition of claim 2 or 3 wherein at least 70% by weight of the granular or powdery resin has a size that can pass through a 100 Tyler mesh sieve.

5. The composition of claim 1 wherein the granular or powdery resin is a nitrogen-containing condensation product of a phenol, an aldehyde and a nitrogen-containing compound having at least two active hydrogens, and has a $D_{960-1020}/D_{1450-1500}$ ratio of from 0.1 to 2.0 in its infrared absorption spectrum measured by a KBr tablet method in which $D_{1450-1500}$ represents the highest absorption intensity of absorption peaks in the range of 1450 to 1500 cm$^{-1}$, and $D_{960-1020}$ represents the highest absorption intensity of absorption peaks in the range of 960 to 1020 cm$^{-1}$.

6. The composition of claim 5 wherein at least 30% of the granular or powdery resin consists of spherical primary particles and their secondary agglomerated particles each having a particle diameter of 0.1 to 100 microns.

7. The composition of claim 5 or 6 wherein at least 70% by weight of the granular or powdery resin has a size that can pass through a 150 Tyler mesh sieve.

8. The composition of claim 5 wherein the granular or powdery resin has a $D_{1280\text{-}1360}/D_{1450\text{-}1500}$ ratio of from 0.15 to 3.0 in its infrared absorption spectrum measured by a KBr tablet method in which $D_{1280\text{-}1360}$ represents the highest absorption intensity of absorption peaks in the range of 1280 to 1360 cm$^{-1}$, and $D_{1450\text{-}1500}$ represents the highest absorption intensity of absorption peaks in the range of 1450 to 1500 cm$^{-1}$.

9. The composition of claim 1 wherein the granular or powdery resin is at least partly fused when maintained at 100° C. for 5 minutes in accordance with the heat fusibility test described in the specification.

10. The composition of claim 1 wherein the granular or powdery resin has a methanol solubility, S defined by the following equation, of at least 20% by weight $$S = \frac{W_o - W_1}{W_o} \times 100\ (\%)$$

wherein $W_o$ is the weight in grams of the resin, and $W_1$ is the weight in grams of the resin left after heating under reflux, when about 10 g of the resin is heated under reflux in 500 ml of substantially anhydrous material.

11. The composition of claim 1 wherein the granular or powdery resin (1) does not substantially melt or melt-adhere when maintained at 100° C. for 5 minutes in accordance with the heat fusibility test described in the specification.

12. The composition of claim 1 wherein the inorganic material is an inorganic material capable of becoming a raw material for ceramics.

13. The composition of claim 1 wherein the inorganic material is a metal having a lower ionizing tendency than magnesium, or a mixture or alloy of such metals.

14. The composition of claim 1 or 12 wherein the inorganic material is a metal oxide, a composition containing a metal oxide as a main ingredient, a metal hydroxide, a metal sulfide, a metal carbide, a metal nitride, an inorganic acid salt of a metal, or an inorganic complex salt or double salt of a metal.

15. The composition of claim 1 which further contains an auxiliary material.

16. The composition of claim 1 which is in the form of a molded article.

* * * * *